(12) United States Patent
Tajima et al.

(10) Patent No.: US 9,769,329 B2
(45) Date of Patent: Sep. 19, 2017

(54) IMAGE READING APPARATUS INCLUDING DOUBLE FEEDING DETECTING UNIT

(71) Applicant: SEIKO EPSON CORPORATION, Tokyo (JP)

(72) Inventors: Hiroyuki Tajima, Fukuoka (JP); Kazuya Yoshikaie, Fukuoka (JP); Katsuhiko Nishizaka, Fukuoka (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/278,442

(22) Filed: Sep. 28, 2016

(65) Prior Publication Data

US 2017/0111524 A1 Apr. 20, 2017

(30) Foreign Application Priority Data

Oct. 15, 2015 (JP) ................................ 2015-203998

(51) Int. Cl.
| | | |
|---|---|---|
| *G06F 15/00* | (2006.01) | |
| *G06F 1/00* | (2006.01) | |
| *G06K 1/00* | (2006.01) | |
| *G06K 15/00* | (2006.01) | |
| *H04N 1/00* | (2006.01) | |

(52) U.S. Cl.
CPC ..... *H04N 1/00037* (2013.01); *H04N 1/00013* (2013.01); *H04N 1/00058* (2013.01); *H04N 1/00687* (2013.01); *H04N 1/00724* (2013.01); *H04N 1/00761* (2013.01); *H04N 2201/0081* (2013.01)

(58) Field of Classification Search
CPC .......... H04N 1/00037; H04N 1/00013; H04N 1/00058; H04N 1/00687; H04N 1/00724; H04N 1/00761; H04N 2201/0081
USPC ........................ 358/1.14, 1.1, 1.18, 506, 498
See application file for complete search history.

(56) References Cited

U.S. PATENT DOCUMENTS

| | | | |
|---|---|---|---|
| 8,657,285 B2 | 2/2014 | Matsuoka et al. | |
| 2012/0307282 A1* | 12/2012 | Ishikawa | B65H 7/125 358/1.14 |
| 2015/0281488 A1* | 10/2015 | Kawauchi | H04N 1/0057 358/1.13 |

FOREIGN PATENT DOCUMENTS

JP 2013-063843 A 4/2013

* cited by examiner

*Primary Examiner* — Douglas Tran
(74) *Attorney, Agent, or Firm* — Global IP Counselors, LLP

(57) ABSTRACT

An image reading apparatus further includes a discrimination unit which discriminates double feeding of a document from a carrier sheet, based on a double feeding detecting sensor (double feeding detecting unit) which detects double feeding of a document, a first detection result (section of L1) which is obtained when the double feeding detecting sensor detects a bonding portion of the carrier sheet, and a second detection result (double feeding detection value which is lower than second threshold value) which is obtained when the double feeding detecting sensor detects double feeding.

8 Claims, 12 Drawing Sheets

IMAGE READING APPARATUS INCLUDING DOUBLE FEEDING DETECTING UNIT

BACKGROUND

1. Technical Field

The present invention relates to an image reading apparatus such as a scanner which reads an image of a document.

2. Related Art

In the related art, in an image reading apparatus, a sheet feeding type in which a transport unit which can transport a document sheet by sheet along a transport path is provided, and a document which is being transported is read by a reading unit which is disposed at a predetermined position in the middle of the transport path, and a flat-bed type in which a carriage moves relatively to a document which is mounted on a document stand, and a reading unit provided in the carriage reads the document have been known.

Meanwhile, in the image reading apparatus of the sheet feeding type, there are a needs for reading an image of a booklet document which is formed of a plurality of pages such as a passport, or a bank book, or an image of a folded document such as a resume. The transport unit is provided with a separating mechanism which separates the plurality of documents which are mounted on a document support sheet by sheet.

There is a case in which it is not possible to appropriately read an image of a booklet document such as a passport, or a folded document such as a resume, since the image is shifted aslant, or the like, due to a force which is applied so as to separate the document sheet by sheet from the separating mechanism, when the document is transported. For this reason, there is a case in which an image of the booklet document or the folded document is read, by interposing the document of the booklet document or the folded document between a colorless-transparent carrier sheet which is formed by bonding one end portion of two sheets, and transporting the carrier sheet.

For example, in JP-A-2013-63843, a document reading apparatus which is provided with an ultrasonic sensor (double feeding detecting unit) which detects double feeding in which a plurality of documents are transported by being overlapped has been disclosed. The ultrasonic sensor includes an ultrasonic transmitter and an ultrasonic receiver which are disposed by facing each other, by interposing a transport path of a medium therebetween. In addition, a type detecting unit which classifies a first medium, and a second medium which is thicker than the first medium which are transported on the transport path, and a double feeding detecting unit which detects whether or not there is double feeding of a medium which is transported, based on an output of the ultrasonic sensor, and a detection result of the type detecting unit are provided in the document reading apparatus. An output intensity of the ultrasonic sensor is adjusted according to a paper thickness of a document which is being transported, and is detected by the type detecting unit. For example, when a transported document is a card document, an output intensity of the ultrasonic sensor is adjusted so as to be strong, compared to a paper document. For this reason, it is possible to prevent a card document from being erroneously detected as double feeding of a paper document.

Meanwhile, the carrier sheet is transported with a side of a bonding portion which is formed by bonding end portions of sheet portions of two pieces which interpose a document at the head. When the carrier sheet is transported, an ultrasonic wave from the transmitter of the double feeding detecting unit attenuates in an attenuation degree which is larger than that in the sheet portions of two pieces, compared to the bonding portion. For this reason, the carrier sheet is erroneously detected as double feeding of a paper document, and an image reading operation of a document is stopped. In order to avoid such an unintended stop of a reading operation, it is necessary to set up a countermeasure for providing an exclusive sensor for the carrier sheet in which it is possible to detect the carrier sheet by classifying thereof from double feeding of a document. In the technology which is described in JP-A-2013-63843, it is possible to adjust an output intensity of the ultrasonic sensor according to a paper thickness of a document; however, since an attenuation degree of an ultrasonic wave between the sheet portion of the carrier sheet and a doubly-fed portion of a paper document is relatively close to each other, there is a case in which it is not easy to discriminate both portions from each other, even when the output intensity of the ultrasonic sensor is adjusted, in addition to the fact that it is necessary to provide a type detecting unit which detects a paper thickness of a document.

SUMMARY

An advantage of some aspects of the invention is to provide an image reading apparatus which can detect double feeding of a document and a carrier sheet by classifying thereof from each other, using a relatively simple configuration.

Hereinafter, means of the invention, and operational effects thereof will be described.

According to an aspect of the invention, there is provided an image reading apparatus for solving the above described problem, the apparatus includes a transport unit which can transport one of a carrier sheet in which two transparent sheets for interposing a document is bonded at a part of a peripheral edge portion, and in a state of interposing a document therebetween, and a document which is set along a transport path; a reading unit which reads a document or the document interposed between the carrier sheet at a reading position in the middle of a path on which the document is transported by the transport unit; at least one detecting unit which includes a double feeding detecting unit which detects double feeding of a document; and a discrimination unit which discriminates double feeding of a document from the carrier sheet based on a first detection result which is obtained when the detecting unit detects a bonding portion of the carrier sheet, and a second detection result which is obtained when the double feeding detecting unit detects double feeding.

According to the configuration, it is possible to discriminate double feeding of a document from the carrier sheet based on the first detection result when at least one detecting unit including the double feeding detecting unit which detects double feeding of a document detects the bonding portion of the carrier sheet, and a second detection result when the double feeding detecting unit detects double feeding. For example, it is possible to detect double feeding of a document and the carrier sheet by classifying thereof, even when an exclusive detecting unit which can detect the carrier sheet is not provided.

In the image reading apparatus, it is preferable that the discrimination unit discriminates as a carrier sheet when obtaining the second detection result, after obtaining the first detection result which is obtained when the detecting unit detects the bonding portion of the carrier sheet, and discriminates as double feeding of a document, when obtaining the second detection result without obtaining the first detection result.

According to the configuration, the discrimination unit discriminates as the carrier sheet when obtaining the second detection result, after obtaining the first detection result which is obtained when the detecting unit detects the bonding portion of the carrier sheet. Meanwhile, the discrimination unit discriminates as double feeding of a document, when obtaining the second detection result without obtaining the first detection result. Accordingly, it is possible to discriminate double feeding of a document from the carrier sheet.

In the image reading apparatus, it is preferable that the detecting unit is the double feeding detecting unit of an ultrasonic wave type, a first threshold value for detecting the bonding portion of the carrier sheet, and a second threshold value for detecting a doubly-fed portion of a document are set as threshold values which are used by the discrimination unit when performing a discrimination based on a detection value of the double feeding detecting unit, and the discrimination unit discriminates as a carrier sheet when obtaining the second detection result in which a detection value exceeds the second threshold value, after obtaining the first detection result in which the detection value is a value between the first threshold value and the second threshold value, and discriminates as double feeding of a document, when obtaining the second detection result without obtaining the first detection result.

According to the configuration, since an attenuation degree of an ultrasonic wave is small compared to that in the sheet portion at which a document is interposed, while the double feeding detecting unit is detecting the bonding portion of the carrier sheet, it is possible to obtain the first detection result in which a detection value exceeds the first threshold value; however, the detection value does not exceed the second threshold value. Thereafter, a detecting target of the double feeding detecting unit is changed to the sheet portion from the bonding portion. Since an attenuation degree of an ultrasonic wave in the sheet portion is larger than that in the bonding portion, it is possible to obtain the second detection result in which a detection value exceeds the second threshold value. In this manner, when the second detection result is obtained after obtaining the first detection result, it is discriminated as the carrier sheet. Meanwhile, when the second detection result is obtained without obtaining the first detection result, it is discriminated as double feeding of a document. Accordingly, it is possible to discriminate double feeding of a document from the carrier sheet.

In the image reading apparatus, it is preferable that the discrimination unit assumes that the first detection result is obtained when a cumulative number of times in which a detection value of the double feeding detecting unit exceeds the first threshold value exceeds a first set number of times, and the second detection result is obtained when a cumulative number of times in which the detection value exceeds the second threshold value exceeds a second set number of times.

According to the configuration, it is assumed that the first detection result is obtained when a cumulative number of times in which a detection value of the double feeding detecting unit is a value between the first threshold value and the second threshold value exceeds the first set number of times. In addition, it is assumed that the second detection result is obtained when a cumulative number of times in which the detection value of the double feeding detecting unit exceeds the second threshold value exceeds the second set number of times. Accordingly, for example, even when a detection value of the double feeding detecting unit varies, and incidentally exceeds the first threshold value or the second threshold value, the value is not set to the first detection result or the second detection result. Accordingly, it is possible to accurately discriminate double feeding of a document from the carrier sheet, relatively, even when the detection value varies.

In the image reading apparatus, it is preferable that a plurality of the detecting units which include the double feeding detecting unit, and a document presence detecting unit which detects a presence or absence of a document at a position on a downstream side of the double feeding detecting unit in a transport direction of a document, and the discrimination unit discriminates as a carrier sheet when the first detection result which is obtained when the document presence detecting unit detects a document is obtained, at a time of obtaining the second detection result which is obtained when the double feeding detecting unit detects the double feeding, and discriminates as double feeding when the first detection result is not obtained, at a time of obtaining the second detection result.

According to the configuration, if the first detection result which is obtained when the document presence detecting unit detects a document is obtained, at a time of obtaining the second detection result when the double feeding detecting unit detects double feeding is obtained, the discrimination unit discriminates a transport target at that time as the carrier sheet. Meanwhile, the discrimination unit discriminates as double feeding of a document when the first detection result is not obtained at a time of obtaining the second detection result. Accordingly, it is possible to discriminate double feeding of a document from the carrier sheet based on a detection result of the double feeding detecting unit and a detection result of the document presence detecting unit. For example, it is not necessary to provide an exclusive sensor for detecting the carrier sheet.

In the image reading apparatus, it is preferable that the discrimination unit obtains a distance from a tip end of a carrier sheet to a double feeding detecting start position at which double feeding starts to be detected, by the double feeding detecting unit, and discriminates as the carrier sheet when the distance is in an allowable range corresponding to a width of the bonding portion of the carrier sheet in the transport direction.

According to the configuration, a distance obtaining unit obtains a distance from the tip end of the carrier sheet to the double feeding detecting start position at which double feeding starts to be detected, by the double feeding detecting unit. The discrimination unit discriminates as the carrier sheet when the distance is in an allowable range corresponding to the width of the bonding portion of the carrier sheet in the transport direction. Accordingly, it is possible to discriminate the carrier sheet with high accuracy.

In the image reading apparatus, it is preferable that the discrimination unit continues an image reading operation using the transport unit and the reading unit when discriminating as a carrier sheet, and stops the image reading operation using the transport unit and the reading unit when discriminating as double feeding of a document.

According to the configuration, the discrimination unit continues the image reading operation using the transport unit and the reading unit when discriminating as the carrier sheet, and stops the image reading operation using the transport unit and the reading unit when discriminating as double feeding of a document. For this reason, it is possible to read a document which is interposed between the carrier sheet, and stop the image reading operation, in consideration there being an error, when it is double feeding of a document.

In the image reading apparatus, it is preferable that the discrimination unit sets the double feeding detecting unit to an OFF state in which detecting is not possible, when discriminating as a carrier sheet.

According to the configuration, the discrimination unit sets the double feeding detecting unit to an OFF state in which detecting is not possible, when discriminating as the carrier sheet. For this reason, it is possible to avoid a situation in which a sheet portion of the carrier sheet is erroneously detected as double feeding using the double feeding detecting unit, and an image reading operation is stopped.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of an image reading apparatus will be described with reference to drawings.

Figure 1:
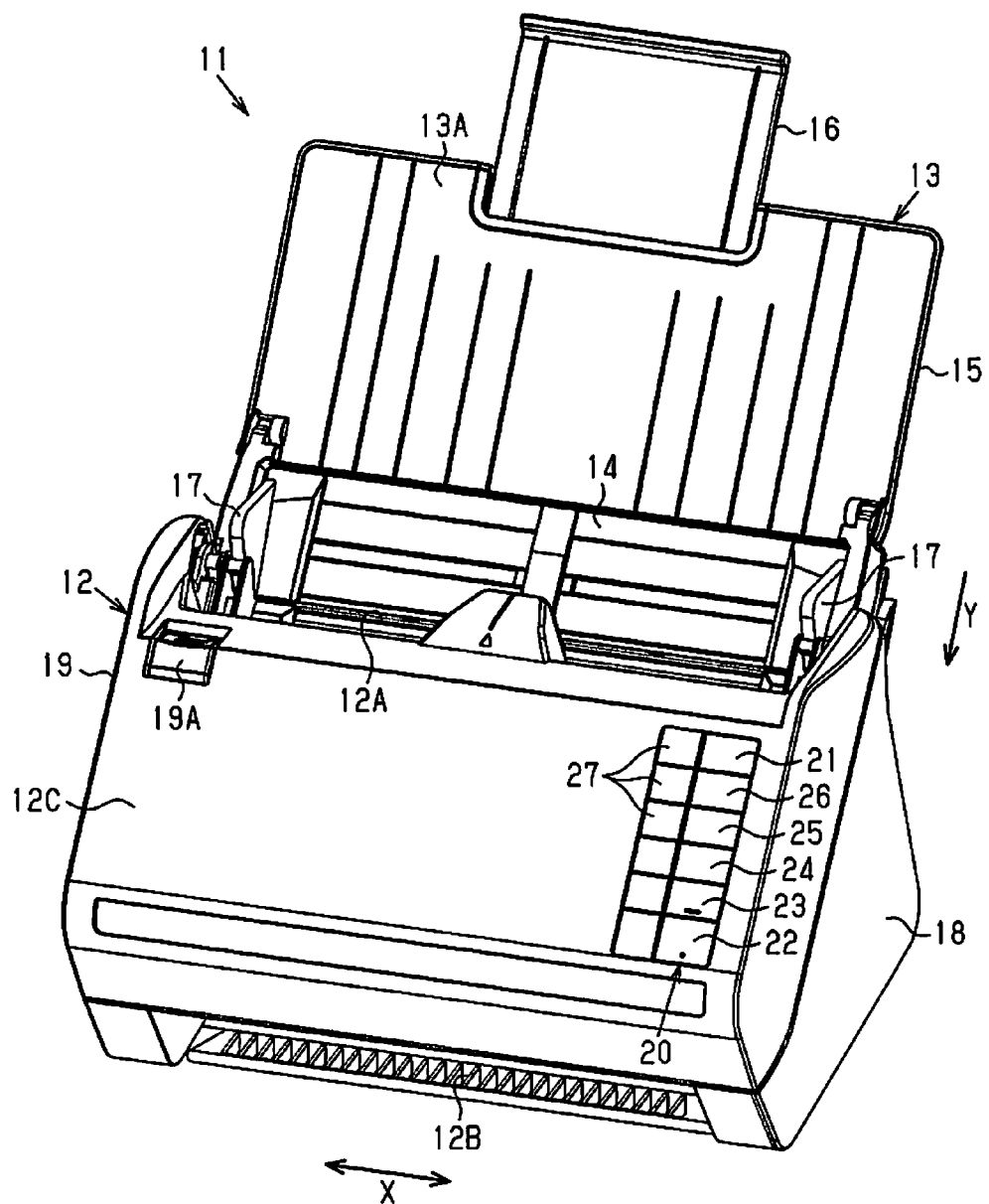
FIG. 1 is a perspective view which illustrates an image reading apparatus according to a first embodiment.

As illustrated in FIG. 1, an image reading apparatus 11 according to the embodiment is provided with an apparatus main body 12 (hereinafter, simply referred to as "main body 12") which is formed in an approximately trapezoidal shape when viewed from a side, and a document support 13 which includes a mounting face 13A on which a document D as an image reading target, and a carrier sheet CS which interposes the document D therebetween, and will be described later are mounted (set). The document D which is mounted on the document support 13 is fed to a feeding port 12A which is open to the upper part of the main body 12, sheet by sheet. The fed document D is transported to the inside of the main body 12 along a predetermined transport path 32 (refer to FIG. 2), of which an image is read at a reading position in the middle of transporting thereof, is discharged from a discharging port 12B which is open to the front-lower part of the main body 12 thereafter, and is mounted on a discharging tray 18A (refer to FIG. 2), for example. According to the embodiment, a document D such as a booklet document, for example, a passport, a bank book, or the like, and a folded document such as a resume which is formed by folding A3-size paper in two, or the like, are set on the document support 13 in each carrier sheet CS, in a state of being interposed between the carrier sheet CS which is colorless and transparent, and will be described later.

The document support 13 is provided with a first support unit 14 of which a base end portion (lower end portion) is rotatably connected to the main body 12, and a second support unit 15 of which a base end portion is rotatably connected to a tip end portion of the first support unit 14. A sliding auxiliary support unit 16 is provided at a tip end portion of the second support unit 15 so as to advance or retreat. The document support 13 obliquely extends to a rear-upper side of the main body 12, and can be disposed at an open position (usable position) which is illustrated in FIG. 1, in which the document support functions as a support on which a document can be mounted, and a closing position (accommodating position) in which a top face portion and a front face portion 12C of the main body 12 are covered, by being rotated toward a paper front direction in FIG. 1 from the open position by a user.

A pair of edge guides 17 which can slide in a width direction X intersecting (orthogonal, particularly) a transport direction Y in which the document D is transported is provided on the mounting face 13A of the document support 13. The document D or the carrier sheet CS which is mounted on the mounting face 13A is positioned in the width direction X with respect to the feeding port 12A, by being interposed between the pair of edge guides 17. In addition, the width direction X is set to a main scanning direction when the image reading apparatus 11 reads an image of a document, and the transport direction Y is set to a sub-scanning direction.

Figure 2:
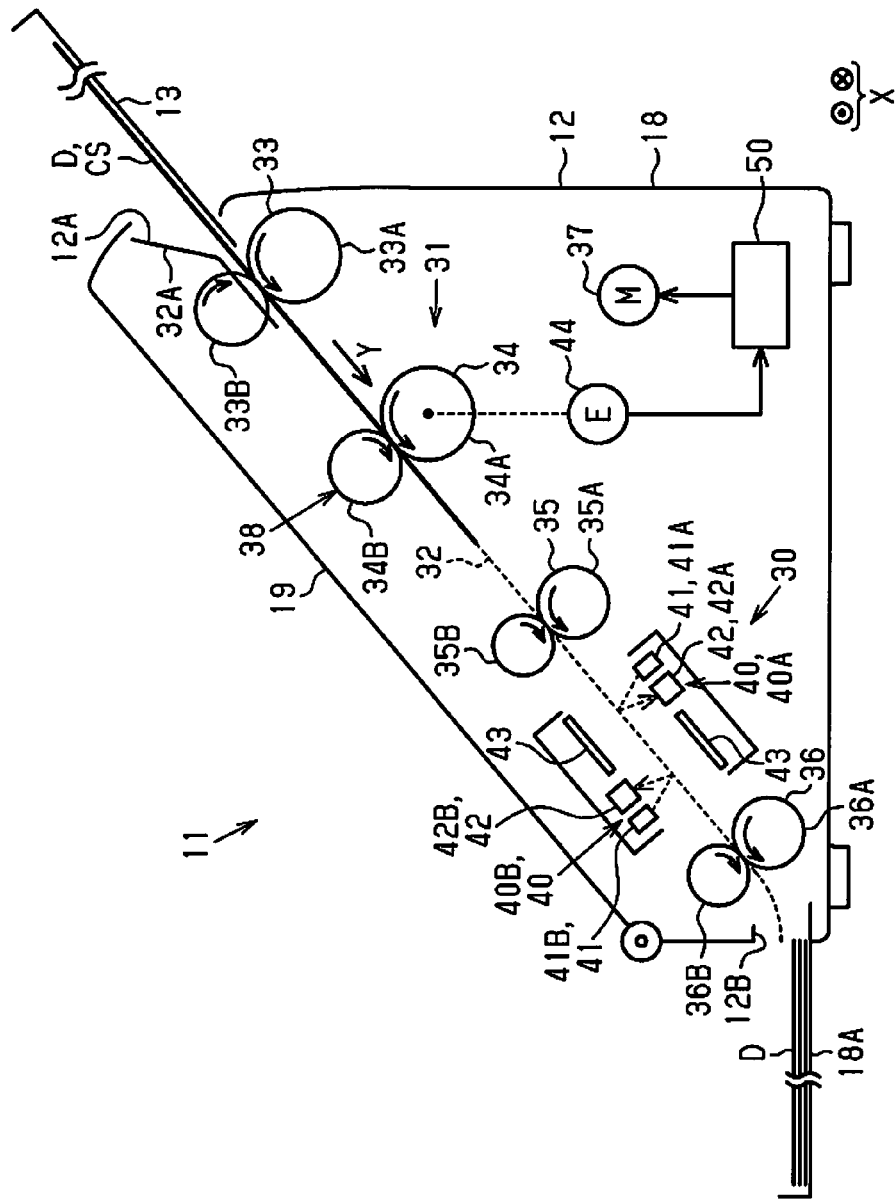
FIG. 2 is a schematic side view which illustrates the image reading apparatus.

As illustrated in FIGS. 1 and 2, the main body 12 is provided with a main body portion 18, and a cover portion 19 which is rotatably connected around a front end portion of the main body portion 18. As illustrated in FIG. 2, a transport path 32 is formed from the feeding port 12A to the discharging port 12B between the main body portion 18 and the cover portion 19, in a state in which the cover portion 19 is disposed at the closing position which is illustrated in FIGS. 1 and 2. When a user releases locking of the cover portion 19 by operating an operation unit 19A which is illustrated in FIG. 1, and the cover portion 19 is rotated from the closing position illustrated in FIG. 1 to the closing position toward the paper front direction in FIG. 1, a transport face portion 39 (refer to FIG. 3) which forms one face portion of the transport path 32 is exposed. By setting the transport face portion 39 to an exposed state by opening the cover portion 19, maintenance, or the like, of rollers 33A to 36A, and the like (refer to FIG. 2), for removing paper clogged (jammed), or for feeding-transporting of a document D is performed.

As illustrated in FIG. 1, an operation unit 20 is provided at the front face portion 12C of the main body 12 (cover portion 19). The operation unit 20 is provided with a plurality of operation switches 21 to 26 which are operated by a user when giving an instruction to the image reading apparatus 11. Specifically, the operation unit 20 is configured of various switches such as a power switch 21, a start switch 22, a stop switch 23, a mode selecting switch 24, a double feeding inspection invalidating switch 25 (double feeding inspection skip switch), and a switch for wireless communication 26. The double feeding inspection invalidating switch 25 is operated when invalidating a double feeding inspection in which a presence or absence of double feeding, in which a plurality of the documents D are fed by being overlapped, is inspected, and the double feeding inspection is not performed when the double feeding inspection is invalidated. A notifying unit 27 configured of an indicating lamp which is capable of performing at least one of lighting and flickering, and lights-out using an LED, or the like, for example, or is capable of changing a lighting color when performing lighting is provided at a position which is close to the operation unit 20. The notifying unit 27 notifies a user of, for example, ON/OFF of a power supply, a mode which is currently selected, validity/invalidity of a double feeding inspection, and the like, using ON/OFF of the indicating lamp, or a change in lighting color.

As illustrated in FIG. 2, an image reading processing mechanism 30 which performs image reading processing (scanning processing) is provided inside the main body 12 of the image reading apparatus 11. The image reading processing mechanism 30 is provided with a transport unit 31 which transports a document D. The transport unit 31 feeds a plurality of documents D which are mounted on the document support 13 while guiding thereof to the inside of the main body 12 along a plate-shaped feeding guide 32A, sheet by sheet, from the feeding port 12A, and transports the fed document D at a constant transport speed along the transport path 32.

The transport unit 31 is provided with a pair of feeding rollers 33 which are disposed at a position at an upstream end of the transport path 32 in the main body 12, a pair of feeding rollers 34 which are disposed on the downstream side of the pair of feeding rollers 33 in the transport direction, a pair of transport rollers 35 which are disposed on the upstream side by interposing a reading position of a document D therebetween in the transport direction Y, and a pair of transport rollers 36 which are disposed on the downstream side.

The pair of feeding rollers 33 and 34 are configured of driving rollers 33A and 34A, and driven rollers 33B and 34B. In addition, the pair of transport rollers 35 and 36 are configured of driving rollers 35A and 36A, and driven rollers 35B and 36B. Each of the driven rollers 33B to 36B performs an accompanying rotation due to rotations of the driving rollers 33A to 36A which form a pair, respectively.

Each of the driving rollers 33A to 36A which configures the plurality of pair of rollers 33 to 36 is rotatably driven using power of a transport motor 37 as a power source of the rollers. The driven roller 34B which configures the pair of feeding rollers 34 is set to a retard roller, and of which a friction coefficient is set to be larger than that of the driving roller 34A with respect to a document D on the outer peripheral face. For this reason, the pair of feeding rollers 34 functions as a separating mechanism 38 which feeds the document D to the downstream side in the transport direction Y by separating the document D sheet by sheet. Accordingly, the plurality of documents D which are mounted on the document support 13 due to a rotation of the pair of feeding rollers 33 are fed to the inside of the main body 12 from the feeding port 12A, sheet by sheet in order from the lowermost document, for example, and are fed to the downstream side in the transport direction Y by being separated sheet by sheet due to a rotation of the pair of feeding rollers 34. When a booklet document or a folded document is fed as is, there is a concern that the document may be fed by being deviated due to a separating operation of the separating mechanism 38. For this reason, when scanning a document D such as a booklet document or a folded document, a user sets the document D to the document support 13 by interposing the document between the carrier sheet CS (refer to FIG. 4), and transports the document D in each carrier sheet CS.

As illustrated in FIG. 2, a pair of reading units 40 is provided on both sides interposing the transport path 32, at a reading position in the middle of the transport path 32 which is formed in the main body 12 using the pair of feeding rollers 33 and 34, and pair of transport rollers 35 and 36. The pair of reading units 40 is formed of a first reading unit 40A and a second reading unit 40B, and is disposed at a position which is slightly deviated to the transport direction Y so as not to face each other. The pair of reading units 40 is configured of a light source 41 which can radiate light to a document D in the middle of being transported, and an image sensor 42 which extends in the main scanning direction (width direction X). In a case of a normal reading mode in which a single face (front face) of a document D is read, the first reading unit 40A performs a reading operation, and in a case of a double side reading mode in which both faces (front and rear faces) of a document D is read, the first reading unit 40A and the second reading unit 40B perform a reading operation together.

The light source 41 is configured of an LED, a fluorescent lamp, or the like, for example. The image sensor 42 receives reflected light which is obtained when light output from the light source 41 is reflected on a document D, or the like, and outputs a pixel signal with a value corresponding to a light receiving amount, by converting the received light into an electric signal. The image sensor 42 is a linear image sensor, for example. The image reading apparatus 11 can perform color scanning and monochrome scanning (grayscale scanning). In the color scanning method, there are a method in which an image sensor is monochrome, and pixel signals of each RGB color is obtained in order from the image sensor, by causing a light source of each RGB color to emit light in time series, and a method in which an image sensor is provided with a photoelectric conversion element of each RGB color which is covered by a color filter, and each pixel signal of RGB is obtained from each of the photoelectric conversion elements by causing a white light source to emit light. Both of the methods may be adopted in the color scanning method. In addition, in the following, there is a case in which the light source 41 and the image sensor 42 are described as a first light source 41A and a first image sensor 42A by being denoted as elements on the first reading unit 40A side, and are described as a second light source 41B and a second image sensor 42B by being denoted as elements on the second reading unit 40B side.

In addition, a color reference plate 43 is disposed at a position facing the image sensor 42 by interposing the transport path 32 therebetween. The color reference plate 43 is for obtaining a white reference value for shading correction, and in which a white reference plate which presents a white color, or a gray reference plate which presents gray (gray color) is used. The gray reference plate is used when detecting a position and a region of a document D based on a different in color or a luminance value between a document and a background, from read data which is obtained by reading the color reference plate 43 as a background of a document (gray background). In addition, in a case in which detecting of a document is performed by using an exclusive sensor for detecting a document, it is preferable to set the color reference plate 43 to the white reference plate.

The image sensor 42 is, for example, a compact image sensor in which a plurality of photoelectric conversion elements are disposed in a line along the main scanning direction X. In addition, the image sensor 42 is specifically, a complementary metal oxide semiconductor (CMOS) image sensor.

The image sensor 42 performs a photoelectrical conversion with respect to light which is received by each photoelectric conversion element, and outputs a pixel signal with a value corresponding to a received light amount.

As illustrated in FIG. 2, an encoder 44 (for example, rotary encoder) which can detect a rotation of one driving roller among the plurality of pair of rollers 33 to 36 is provided inside the main body 12. The encoder 44 outputs a detection signal including the number of pulses which is proportional to a rotation amount of a diving roller. A detection signal of the encoder 44 is input to a controller 50 which is disposed inside the main body 12, and is used when grasping a position (transport position) of a transport target in the middle of being transported, when the controller 50 counts the number of pulses of the detection signal from a position in which a tip end of a transport target such as a document D or a carrier sheet CS is detected.

The light source 41 and the image sensor 42 which configure the transport motor 37, and the reading unit 40 (40A and 40B) are controlled by the controller 50. In addition, the controller 50 controls the image reading apparatus 11 based on an instruction which is given by using an operation signal from the operation unit 20 which is operated by a user.

Figure 3:
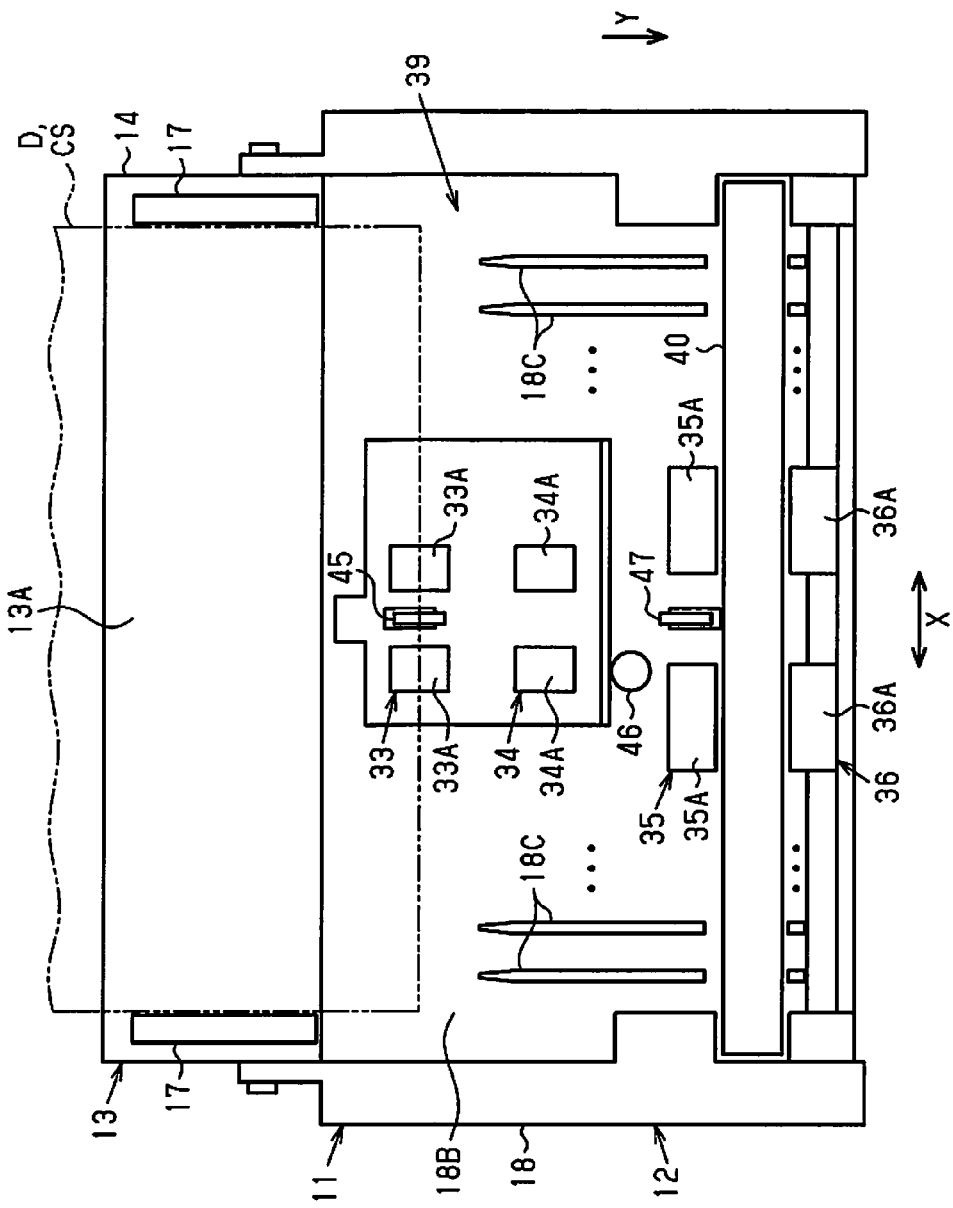
FIG. 3 is a schematic plan view which illustrates a transport face portion of a main body portion.

Subsequently, a transport face portion 39 which forms a lower face portion in the transport path of a document will be described with reference to FIG. 3. As illustrated in FIG. 3, the transport face portion 39 which is formed by a top face of the main body portion 18 includes a transport plate 18B which covers the top face of the main body portion 18, and a plurality of ribs 18C which protrude from the top face, and extend in parallel to each other along the transport direction Y. At an approximately center portion in the width direction X of the transport face portion 39, each of the driving rollers 33A and 34A which configures the pair of feeding rollers 33 and 34, and each of driving rollers 35A and 36A which configure the pair of transport rollers 35 and 36 are disposed with a slight interval in the width direction X, respectively, by forming a pair, in order from the upstream side in the transport direction Y. A document sensor 45 is disposed between the pair of driving rollers 33A which configure the pair of feeding rollers 33. The document sensor 45 is a contact-type sensor which includes, for example, a lever, and detects a presence or absence of a document D or a carrier sheet CS which is set on the document support 13, when the lever is pressed.

The controller 50 grasps a position (transport position) of a transport target in the transport direction Y using a discrete value thereof, when the transport target is set to a feeding position, and a transport counter 81 which is reset when the document sensor 45 is turned on counts the number of pulses of a detection signal which is input from the encoder 44 in the middle of driving of the transport motor 37.

In addition, a double feeding detecting sensor 46 is disposed at a position between the driving roller 34A and the driving roller 35A in the transport direction Y. The double feeding detecting sensor 46 is an ultrasonic-type sensor, and is provided with a transmitter 46A which can transmit an ultrasonic wave, and a receiver 46B (refer to FIG. 7) which is disposed at a position facing the transmitter 46A by interposing the transport path 32 therebetween, and can receive the ultrasonic wave from the transmitter 46A. The double feeding detecting sensor 46 detects double feeding of a document D using a principle that the ultrasonic wave from the transmitter 46A attenuates in a gap between two documents D which are doubly fed. Since an attenuation degree of an ultrasonic wave when passing through two or more documents D is larger than an attenuation degree of an ultrasonic wave when passing through one document, if a detection value exceeds (is lower than) a predetermined threshold value (second threshold value SH2 in FIG. 8) due to the large attenuation degree, double feeding is detected. Meanwhile, since an attenuation degree of an ultrasonic wave when passing through one document D is small, there is no case in which a detection value exceeds a predetermined threshold value, and double feeding is not detected. In addition, since a sheet portion 52 other than the bonding portion 51 of the carrier sheet CS is formed of two pieces, and an attenuation degree of the ultrasonic wave which attenuates at a gap between two sheet portions 52 is large, there is a case in which the double feeding detecting sensor 46 erroneously detects the carrier sheet CS as double feeding of a document. For this reason, when reading the document D by interposing thereof between the carrier sheet CS, a user can invalidate a double feeding inspection by operating the double feeding inspection invalidating switch 25.

In addition, a document presence detecting sensor 47 which can detect a presence or absence of a document D, and as an example of a document presence detecting unit is disposed between the pair of driving rollers 35A which configures the pair of transport rollers 35.

The document presence detecting sensor 47 is a contact-type sensor which includes a lever (contactor), for example, detects a tip end when the tip end of a document D or carrier sheet CS pushes the lever, and the lever is switched from a detecting state to a non-detecting state, and detects a rear end when the rear end passes through the lever, the lever is not pressed, and is switched from the detecting state to the non-detecting state. A detection result of the document presence detecting sensor 47 is used when controlling a start and end timing of a reading operation of the reading unit 40 (40A and 40B) which is disposed on the downstream side in the transport direction Y thereof.

Figure 4:
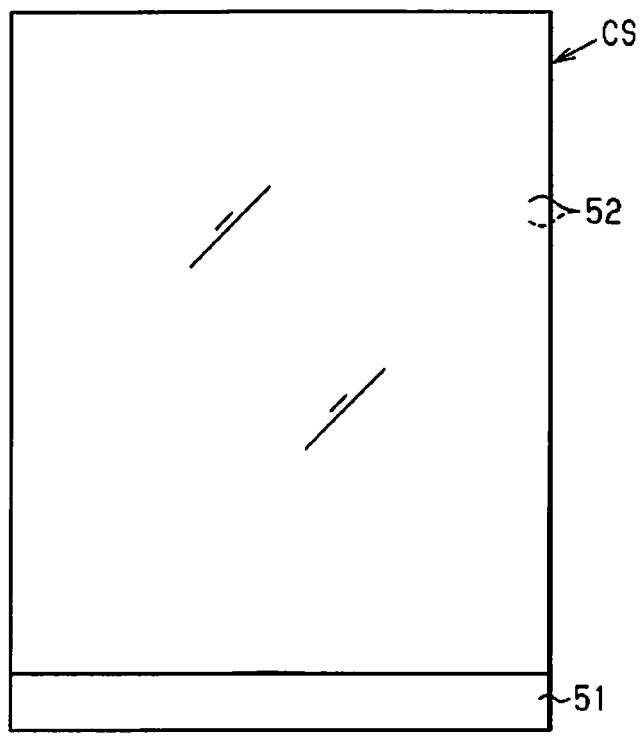
FIG. 4 is a schematic plan view which illustrates a carrier sheet.
Figure 5:
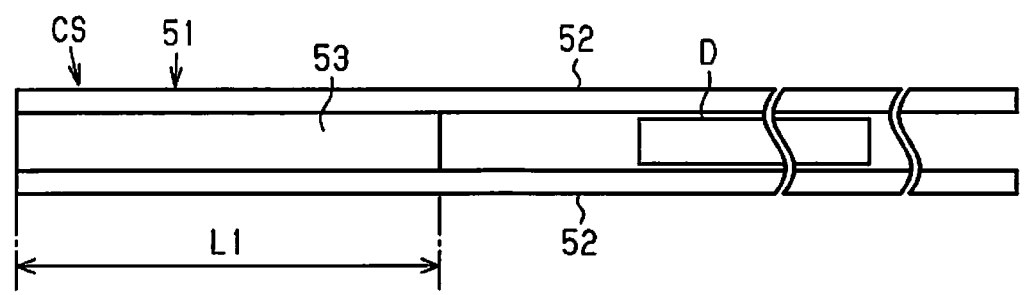
FIG. 5 is a partially ruptured schematic side view which illustrates a carrier sheet which interposes a document therebetween.

Subsequently, the carrier sheet CS will be described with reference to FIGS. 4 and 5. As illustrated in FIG. 4, the carrier sheet CS which is quadrangular sheet of two pieces, and is formed of a colorless-transparent synthetic resin includes a bonding portion 51 which extends in a belt shape in the width direction X with a constant width (for example, in range of 5 to 20 mm) which is bonded at a part of a peripheral edge portion, and a sheet portion 52 of two pieces which extends from the bonding portion 51. As illustrated in FIG. 5, the carrier sheet CS is used by interposing a document D between the sheet portion 52 of two pieces. For this reason, the sheet portion 52 of two pieces is formed in a size much larger than a size of a document D of a standard size (A4 size, B5 size, or the like) which is used by being interposed therebetween.

The carrier sheet CS is used by being set on the document support 13, and in a direction in which the bonding portion 51 side becomes the head in the transport direction Y. That is, the carrier sheet CS which interposes a document D is set in a state in which the bonding portion 51 is inserted into the feeding port 12A. In addition, the set carrier sheet CS is fed into the main body 12 from the bonding portion 51 side. The carrier sheet CS which is fed is transported in the transport direction Y with the bonding portion 51 at the head, along the transport path 32 in the main body 12.

As illustrated in FIG. 5, the bonding portion 51 of the carrier sheet CS is opaque since the end portion of two transparent sheets is bonded through an opaque bonding material 53, for example, and of which a width in the transport direction Y is set to L1. In the bonding portion 51, there is no interval since the bonding material 53 is interposed between two transparent sheets, and an attenuation degree of an ultrasonic wave when the double feeding detecting sensor sets the bonding portion 51 to a detecting target is relatively small. Meanwhile, since the sheet portion 52 of two pieces is colorless and transparent, and there is a gap (air space) therebetween regardless of a presence or absence of the document D, an attenuation degree of an ultrasonic wave when the double feeding detecting sensor 46 sets the sheet portion 52 to a detecting target is larger than the attenuation degree of the ultrasonic wave when the bonding portion 51 is set to the detecting target. As a result, a detection value when a detecting target of the double feeding detecting sensor 46 is the sheet portion 52 is lower than a second threshold value SH2, and it is erroneously detected as double feeding of the document D.

For this reason, when using the carrier sheet CS, it is necessary for a user to disable a double feeding inspection by operating the double feeding inspection invalidating switch 25, or the input unit 101 of an host device 100. In order to solve such a problem, it is possible to adopt a configuration in which an exclusive sensor (carrier sheet sensor) which can detect the carrier sheet CS is provided, and a double feeding inspection is invalidated when the exclusive sensor detects the carrier sheet CS. However, since the number of sensors increases, it causes a rise in manufacturing cost of the image reading apparatus 11, or makes a structure complicated. Therefore, according to the embodiment, double feeding of a document D is discriminated from the carrier sheet CS by using an existing sensor which is used in other uses. Accordingly, the image reading apparatus 11 may not include an exclusive carrier sheet sensor.

Subsequently, an electrical configuration of the image reading apparatus 11 will be described with reference to FIG. 6. As denoted in FIG. 6, the controller 50 is provided with a computer 60 which is configured of a microprocessor, or the like, a storage unit 61, an input unit 62 which is formed of an input interface to which various data or a signal is input from the host device 100, and an output unit 63 which is formed of an output interface from which read data which is read by the image reading apparatus 11 is output to the host device 100. In addition, the controller 50 is provided with a timing generator 64 (hereinafter, also denoted by "TG 64") which outputs a pulse signal regulating various operation timings which includes a reading operation of a pixel signal to the image sensors 42A and 42B. In addition, the controller 50 is provided with an analog front end 65 (hereinafter, also denoted by "AFE 65") which performs analog/digital conversion (A/D conversion) with respect to the pixel signal which is input from the image sensors 42A and 42B. The storage unit 61 is configured of a non-volatile memory, and a RAM, for example.

The image reading apparatus 11 is connected to the host device 100 through a communication cable. The host device 100 is configured of a personal computer (hereinafter, also referred to as "PC"), for example, and is provided with the input unit 101 and a display unit 102. In addition, the host device 100 is not limited to PC, and may be a smart device such as a mobile information terminal (PDA (Personal Digital Assistants)), a tablet PC, or a smart phone.

Figure 6:
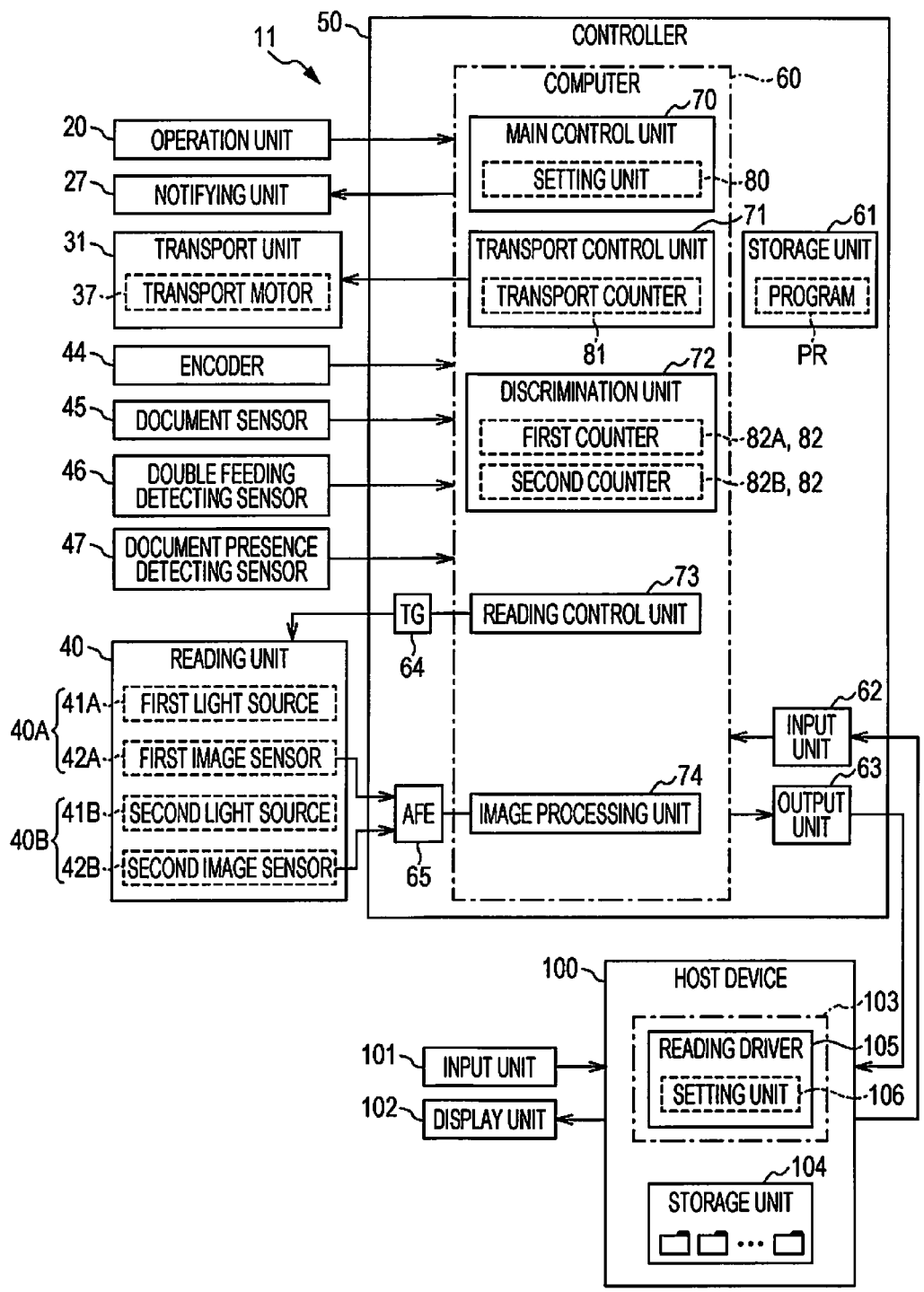
FIG. 6 is a block diagram which illustrates an electrical configuration and a functional configuration of the image reading apparatus.

As denoted in FIG. 6, a computer 103 and a storage unit 104 are built in the host device 100. The computer 103 is provided with a reading driver 105. The reading driver 105 is configured of software which is installed in the host device 100.

The reading driver 105 is provided with a setting unit 106 which sets validity/invalidity of a double feeding inspection. The setting unit 106 receives setting information of valid/invalid of a double feeding inspection which is instructed from an operation of the input unit 101 by a user, transmits the received setting information to the image reading apparatus 11, and sets the setting information in a setting unit 80 in the main control unit 70. Setting of the setting information also can be performed when a user operates the double feeding inspection invalidating switch 25 of the image reading apparatus 11. That is, the main control unit 70 of the image reading apparatus 11 is provided with the setting unit 80 which sets setting information of valid/invalid of a double feeding inspection which is instructed when a user operates the double feeding inspection invalidating switch 25. In addition, the user sets setting conditions (task condition) related to image reading processing, by operating the input unit 101. In the setting conditions, a reading condition including a reading resolution, a reading color, or the like, a stitch direction (direction of fold) which regulates a side (fold) on which two images when reading a folded document are bonded, image processing conditions including a shading correction, a gamma correction, or the like, and a storing condition including a storage format, a transferring method, and a storage destination of image data are included.

In the image reading apparatus 11 according to the embodiment, there is 300 dpi/600 dpi in the reading resolution, and there is monochrome (grayscale)/color in the reading color, for example. In addition, the stitch direction is a condition which regulates whether a side at which two images obtained by reading both faces of a folded document which is interposed between the carrier sheet CS are bonded is to be the left side or the right side. For the storage format, there is a PDF format, a JPEG format, a GIF format, or the like. In addition, in the storage method, there is a transfer to the host device 100, and a mail transfer, and as the storage destination, an address of a folder in the storage unit 104 in the host device 100, or a mail address of a mail transfer destination are designated. In addition, the setting conditions may be set when a user operates the operation unit 20 of the image reading apparatus 11.

Figure 15:
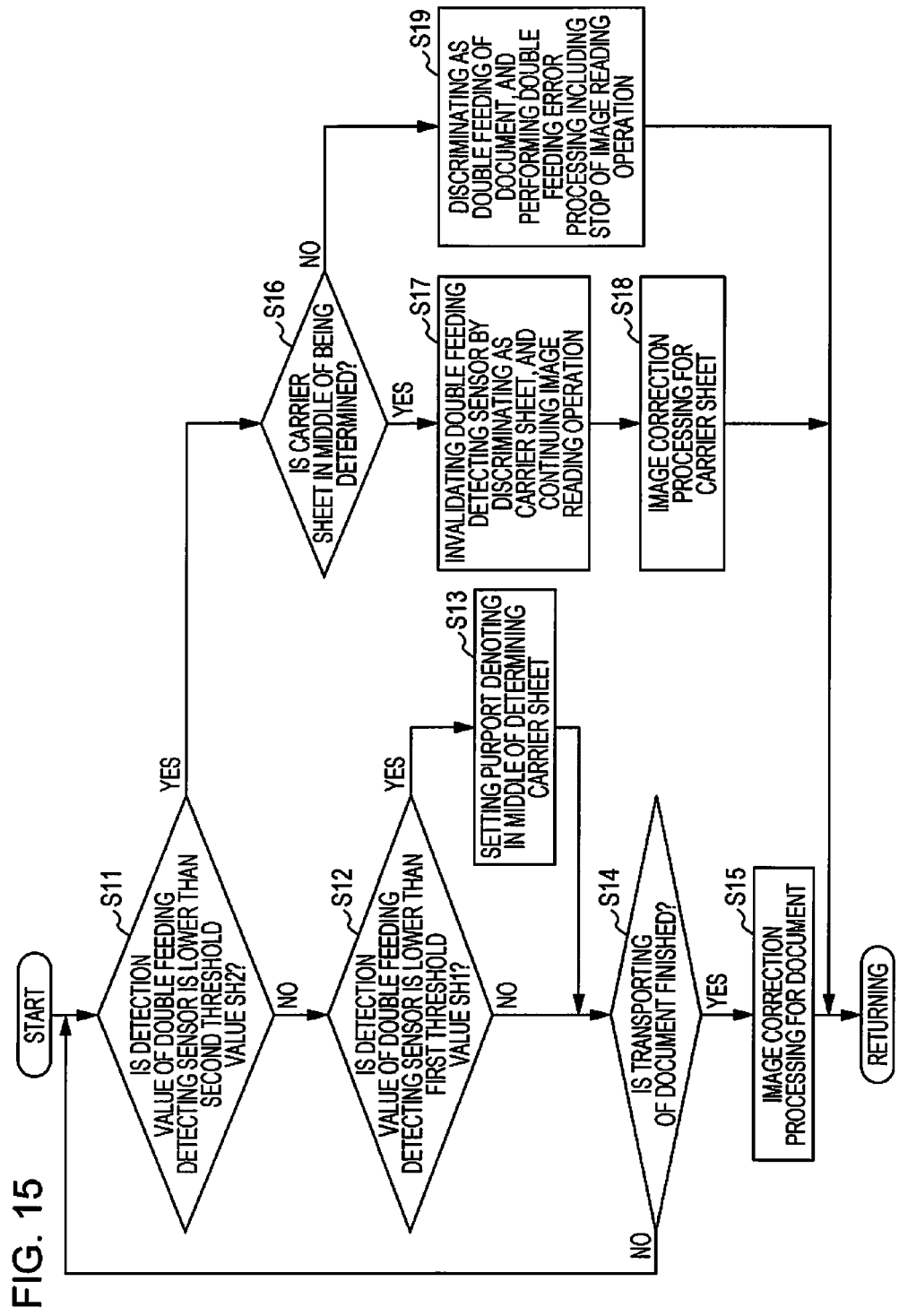
FIG. 15 is a flowchart which describes a carrier sheet discriminating process.

A program PR, or the like, including a program for discrimination processing of a carrier sheet, which is described in a flowchart in FIG. 15 is stored in a storage unit 61 denoted in FIG. 6. A computer 60 which is denoted in FIG. 6 functions as various functional units in the figure, by executing the program PR. That is, as denoted in FIG. 6, the computer 60 is provided with the main control unit 70, a transport control unit 71 which controls the transport motor 37, the discrimination unit 72 which discriminates whether a transport target is the carrier sheet CS or a non-carrier sheet, a reading control unit 73 which controls the reading unit 40, and an image processing unit 74 which performs various image processing, or the like, with respect to read data, as functional units. In addition, as the non-carrier sheet, there is a document D, a credit card, or the like.

The transport control unit 71 drives the transport motor 37 according to an instruction from the main control unit 70, and feeds a transport target (hereinafter, also referred to as "transport sheet") which is set on the document support 13 to the inside of the main body 12, sheet by sheet, by rotating the plurality of pair of rollers 33 to 36. In addition, the transport control unit 71 transports the fed transport target along the transport path 32 at a constant transport speed corresponding to the reading condition. In the transport target, a credit card, or the like, is also included, in addition to the document D or the carrier sheet CS. In the transport target, there is the carrier sheet CS, and a non-carrier sheet other than the carrier sheet. In the non-carrier sheet, a document D, a credit card, or the like, is included.

The discrimination unit 72 discriminates a type of a transport target based on a detection signal of the double feeding detecting sensor 46.

Specifically, the discrimination unit 72 according to the embodiment discriminates whether a transport target is the carrier sheet CS or a non-carrier sheet, other than the carrier sheet CS based on the detection signal of the double feeding detecting sensor 46. According to the embodiment, a plurality of threshold values of SH1 and SH2 illustrated in FIG. 8, which are used by the discrimination unit 72 when performing discriminating are provided. Three determining ranges of R0, R1, and R3 are set, using the two threshold values of SH1 and SH2. That is, the document determining range R0 which is larger than the first threshold value SH1 (threshold value for determining carrier sheet), the first determining range R1 which is the second threshold value SH2 (threshold value for determining double feeding) or more, and less than the first threshold value SH1, and the double feeding determining range R2 which is less than the second threshold value SH2 are set (refer to FIGS. 8, 10, 11, and 14).

The discrimination unit 72 denoted in FIG. 6 determines to which determining range among three determining ranges a detection value of the double feeding detecting sensor 46 belongs, and determines a movement distance of the determining range to which the detection value belongs. In addition, the discrimination unit 72 discriminates a type and a state of the transport target based on a determining range to which the detection value of the double feeding detecting sensor 46 belongs, and a movement distance of the transport target when belonging to the determining range. The discrimination unit 72 discriminates at least whether the transport target is a carrier sheet CS or a non-carrier sheet.

The discrimination unit 72 includes a plurality of counters 82. The counter 82 is a counter for counting a discrete value corresponding to a movement distance of a transport target when the detection value of the double feeding detecting sensor 46 belongs to one of the determining ranges of R0, R1, and R2. In the example, two counters of a first counter 82A and a second counter 82B are provided as the plurality of counters 82. The computer 60 obtains a detection value of the double feeding detecting sensor 46 in each predetermined time interval in a predetermined sampling cycle. The computer 60 obtains a detection value in a sampling cycle which is in inverse proportion to a transport speed of a transport target, for example. That is, the computer 60 obtains the number of detection values which is proportional to a movement distance of a transport target, at least in the middle of detecting the transport target using the double feeding detecting sensor 46.

The first counter 82A counts the number of times in which a detection value of the double feeding detecting sensor 46 which is obtained in a predetermined sampling cycle belongs to the first determining range R1. That is, the first counter 82A counts a total movement distance in which a transport target moved, while taking a value in the first determining range R1 which is a detection value of the double feeding detecting sensor 46. In addition, the second counter 82B counts the number of times in which a detection value of the double feeding detecting sensor 46 belongs to the second determining range R2. That is, the second counter 82B counts a total movement distance in which a transport target moved, while taking a detection value in the second determining range R2 which is a detection value of the double feeding detecting sensor 46.

Figure 7:
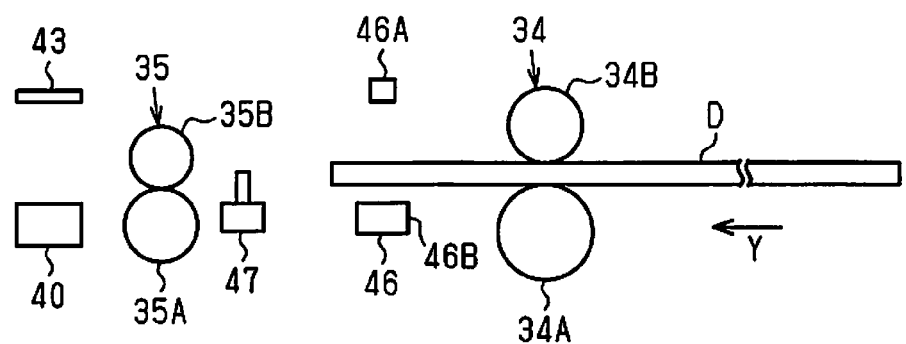
FIG. 7 is a schematic side view which illustrates a state when one document is detected by a double feeding detecting sensor.

The double feeding detecting sensor 46 in the example is provided with a transmitter 46A which transmits an ultrasonic wave as illustrated in FIG. 7, and a receiver 46B which receives the ultrasonic wave transmitted from the transmitter 46A (refer to FIG. 7 for both), for example. The ultrasonic wave which is transmitted from the transmitter 46A attenuates when passing through a transport target such as a document D, and the receiver receives the attenuated ultrasonic wave. In addition, the double feeding detecting sensor 46 outputs a detection signal with a detection value of a magnitude which is proportional to, for example, an amplitude of the received ultrasonic wave of the receiver 46B.

In addition, the double feeding detecting sensor 46 according to the embodiment has a configuration in which, when attenuation of an ultrasonic wave at a time of being received by the receiver 46B is large, the double feeding detecting sensor has a small detection value; however, in contrast to this, it may be a configuration in which, when attenuation of an ultrasonic wave is large, the double feeding detecting sensor has a large detection value. In a case of the latter, the first determining range R1 is in a range of the first threshold value SH1 or more, and less than the second threshold value SH2, and the second determining range R2 is in a range of the second threshold value SH2 or more.

Figure 8:
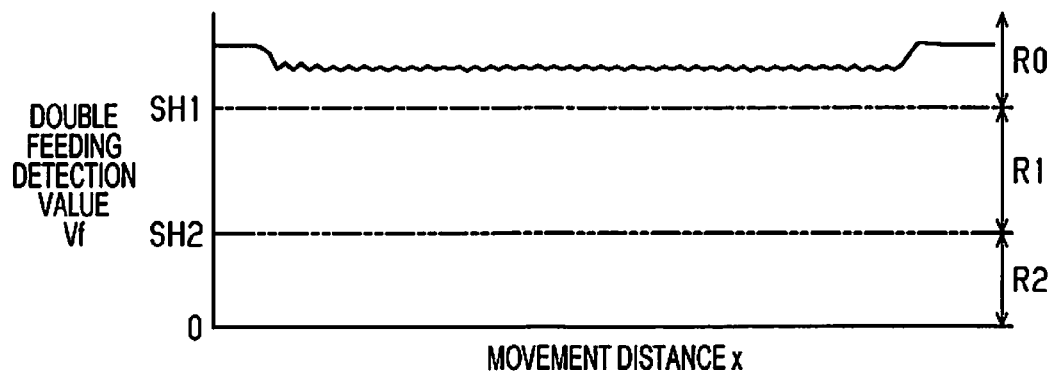
FIG. 8 is a graph which denotes a detection value of the double feeding detecting sensor when detecting one document.

Subsequently, a method of discriminating a type of a transport target based on a detection value of the double feeding detecting sensor 46 will be described with reference to FIGS. 7 to 14. In graphs in FIGS. 8, 10, 11, and 14, a horizontal axis denotes a movement distance of a transport target, and a vertical axis denotes a detection value Vf of the double feeding detecting sensor 46 (hereinafter, also referred to as "double feeding detection value Vf"). FIG. 7 illustrates a state in which the double feeding detecting sensor 46 is detecting one document D as a transport target. At this time, as illustrated in FIG. 8, a detection value Vf of the double feeding detecting sensor 46 exceeds the first threshold value SH1, and belongs to the document determining range R0. Accordingly, when a detection value Vf of the double feeding detecting sensor 46 has a value of the first threshold value SH1 or more over a predetermined distance (for example, predetermined value in a range of 20 to 50 mm), the discrimination unit 72 discriminates that the transport target is one document D which is normally transported. In addition, in FIGS. 7, 9, 12, and 13, a transport target is schematically illustrated so as to be larger than an actual size.

Figure 9:
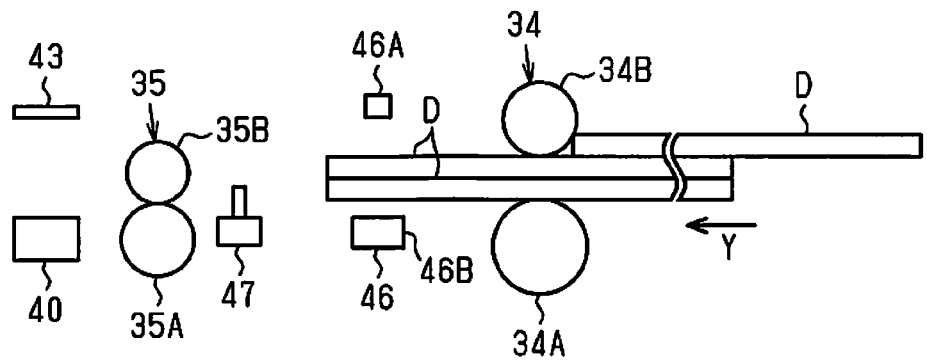
FIG. 9 is a schematic side view which illustrates a state when the double feeding detecting sensor detected a doubly fed document.
Figure 10:
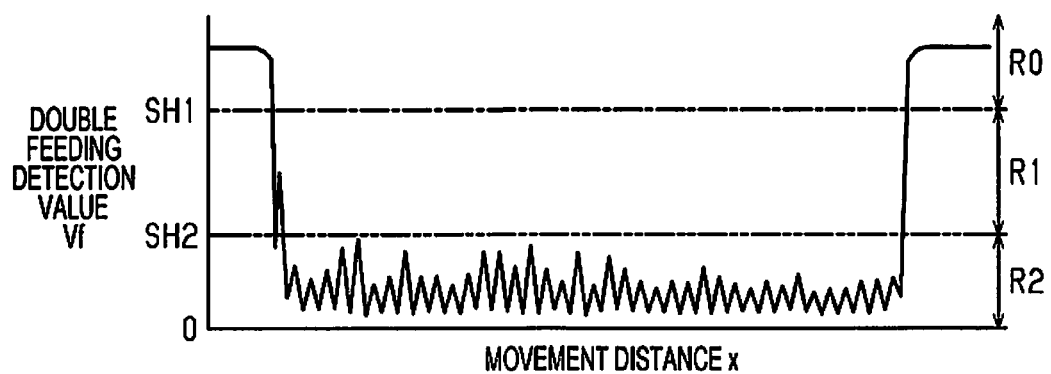
FIG. 10 is a graph which denotes a detection value of the double feeding detecting sensor when detecting a doubly fed document.

FIG. 9 illustrates a state in which the double feeding detecting sensor 46 is detecting a doubly-fed portion of a doubly-fed document D as a transport target. Here, since a gap (air space) is present between the doubly-fed portions of the document D, an ultrasonic wave is remarkably attenuated due to the gap. For this reason, as illustrated in FIG. 10, a detection value Vf of the double feeding detecting sensor 46 (double feeding detection value) becomes a value less than the second threshold value SH2, and belongs to the second determining range R2. Accordingly, the number of times in which a detection value Vf obtained in each sampling cycle from the double feeding detecting sensor 46 belongs to the second determining range R2 is counted in the second counter 82B, and when a total of the number of times (discrete value) reaches a value corresponding to a movement of a predetermined distance (for example, predetermined value in a range of 20 to 50 mm) of a transport target, the discrimination unit 72 discriminates that the transport target is a doubly-fed document D.

Figure 11:
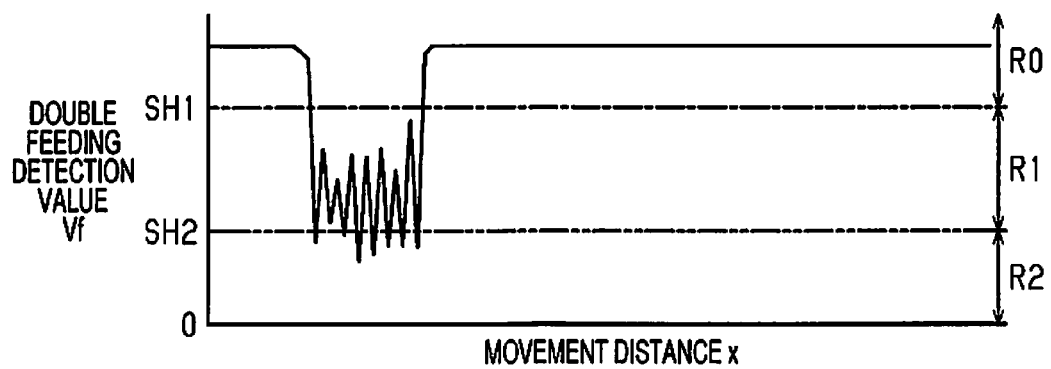
FIG. 11 is a graph which denotes a detection value of the double feeding detecting sensor when detecting a credit card.

In addition, FIG. 11 illustrates a graph when the double feeding detecting sensor 46 is detecting a credit card as a transport target. Since the credit card is thicker than a document D, an attenuation degree of an ultrasonic wave is relatively large. For this reason, as illustrated in FIG. 11, a detection value Vf of the double feeding detecting sensor 46 (double feeding detection value) is less than the first threshold value SH1, and for example, the value belongs to the first determining range R1 or the second determining range R2. Accordingly, the detection value Vf of the double feeding detecting sensor 46 belongs to at least one of the first determining range R1 and the second determining range R2; however, when a movement distance of the transport target at a time of belongs to the determining range is in a predetermined range which is determined by a length of the credit card, the discrimination unit 72 discriminates the transport target is a credit card.

Figure 12:
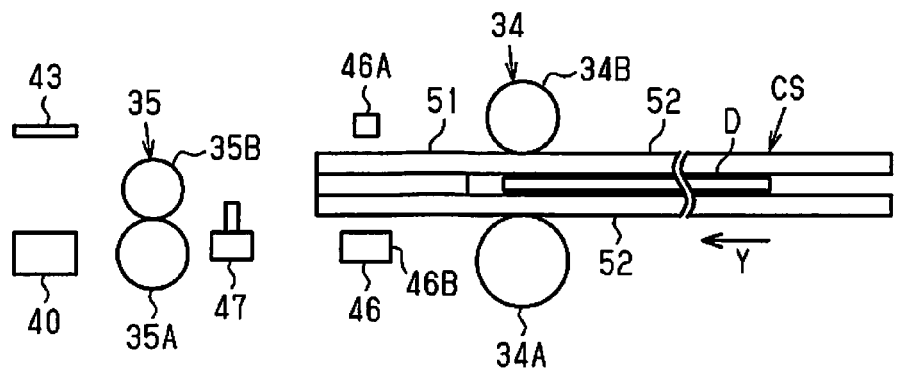
FIG. 12 is a schematic side view which illustrates a state when the double feeding detecting sensor detects a bonding portion of the carrier sheet.

FIG. 12 illustrates a state when the double feeding detecting sensor 46 is detecting the carrier sheet CS as a transport target, and in particular, the bonding portion 51 is set to a detecting target. As illustrated in FIG. 5, the bonding portion 51 is formed by bonding two transparent sheets using the bonding material 53, there is no gap (air space) therebetween like the sheet portion 52; however, the bonding portion is thicker than a normal document D which is formed of plain paper, or the like.

Figure 13:
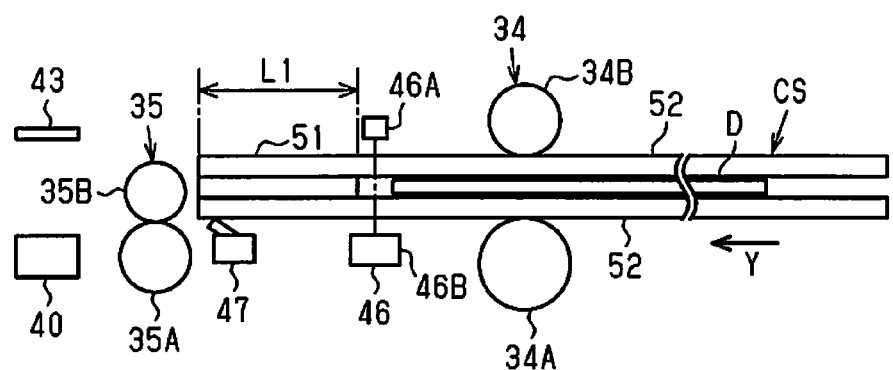
FIG. 13 is a schematic side view which illustrates a state when the double feeding detecting sensor detects a sheet portion of the carrier sheet.
Figure 14:
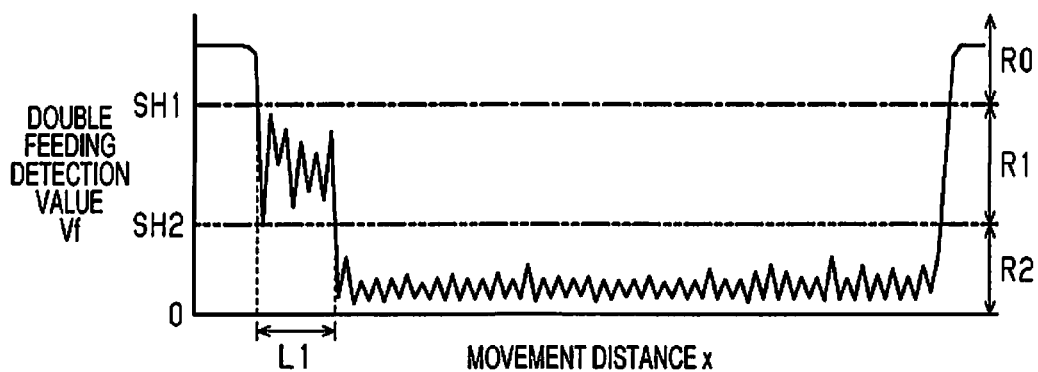
FIG. 14 is a graph which denotes a detection value of the double feeding detecting sensor when detecting the carrier sheet.

For this reason, an attenuation degree of an ultrasonic wave in the bonding portion 51 is larger than one document D, and is smaller than the sheet portion 52. For this reason, as illustrated in FIG. 14, when the detecting target is the bonding portion 51, a detection value Vf of the double feeding detecting sensor 46 (double feeding detection value) is lower than the first threshold value SH1; however, the detection value Vf is not lower than the second threshold value SH2, and belongs to the first determining range R1 (SH2≤R1<SH1). Thereafter, as illustrated in FIG. 13, when the detecting target is changed to the sheet portion 52 from the bonding portion 51, due to a presence or absence of the gap (air space) in the sheet portion 52, an ultrasonic wave remarkably attenuates, compared to the bonding portion 51. For this reason, as illustrated in FIG. 14, when the carrier sheet CS moves by a distance corresponding to the width L1 of the bonding portion 51, after a tip end of the carrier sheet CS becomes a detecting target of the double feeding detecting sensor 46, the detecting target is changed to the sheet portion 52 from the bonding portion 51. When a discrete value of the first counter 82A which counts the number of times in which a double feeding detection value Vf belongs to the first determining range R1 exceeds the first number of setting times corresponding to the width L1 of the bonding portion 51, it is set to a first detection result.

When a detecting target of the double feeding detecting sensor 46 is changed to the sheet portion 52 from the bonding portion 51, a determining range to which a detection value Vf belongs is moved from the first determining range R1 to the second determining range R2. In addition, when a discrete value of the second counter 82B which counts the number of times in which a double feeding detection value Vf belongs to the second determining range R2 exceeds the second number of setting times corresponding to a predetermined distance (for example, predetermined value in a range of 20 to 50 mm), it is set to a second detection result. The discrimination unit 72 discriminates that a transport target is the carrier sheet CS in a case in which the second detection result is obtained after obtaining the first detection result. In addition, it is preferable that a predetermined distance is a distance in which it is possible for the discrimination unit 72 to discriminate a type and a state of a transport target, before the reading unit 40 starts a reading operation of a document D.

According to the embodiment, a detection value Vf of the double feeding detecting sensor 46 when a detecting target is the bonding portion 51, that is, a detection value Vf which belongs to the first determining range R1, denoted by SH2≤Vf<SH1, corresponds to an example of the first detection result. In other words, a double feeding detection value Vf when belonging to a range between the first threshold value SH1 and the second threshold value SH2 corresponds to an example of the first detection result. In addition, a detection value Vf when a detecting target of the double feeding detecting sensor 46 is the sheet portion 52, that is, a detection value which belongs to the second determining range R2, denoted by Vf<SH2, corresponds to an example of the second detection result. In other words, a double feeding detection value Vf when belonging to a range which exceeds the second threshold value SH2 corresponds to an example of the second detection result.

Here, in a credit card, or a part of thick document, there is a case in which a double feeding detection value Vf belongs to the first determining range R1, similarly to the bonding portion 51 of the carrier sheet CS. However, in a case of the carrier sheet CS, when a detecting target is changed to the sheet portion 52 thereafter, a determining range to which the double feeding detection value Vf belongs is switched from the first determining range R1 to the second determining range R2. In contrast to this, in a case of a credit card, there is no case in which switching is performed, basically, except for the fact that a determining range to which the double feeding detection value Vf belongs partially varies. For this reason, it is possible to discriminate a transport target which is relatively thick such as a credit card from the carrier sheet CS. As described above, the discrimination unit 72 according to the embodiment can discriminate a type of a transport target (document, carrier sheet, credit card, or the like), and a state (double feeding) based on the double feeding detection value Vf. In other words, it is possible to discriminate at least the carrier sheet CS from a non-carrier sheet (document, credit card, document in double feeding state).

The discrimination unit 72 determines whether or not to lower the second threshold value SH2, and determines whether or not to lower a determination threshold value of a carrier sheet, every time obtaining a detection value Vf of the double feeding detecting sensor 46 in each interval of a predetermined time, in order to detect a type and a state of the above described transport target. When the detection value Vf is not lower than the second threshold value SH2, and is lower than the first threshold value SH1, the first counter 82A (counter for determining carrier sheet) is incremented by "1". In addition, when a detection value Vf of the double feeding detecting sensor 46 is lower than the second threshold value SH2, the second counter 82B (counter for determining double feeding) is incremented by "1". A discrete value of the first counter 82A corresponds to the number of times in which a double feeding detection value Vf obtained in every predetermined sampling cycle belongs to the first determining range R1, that is, a movement distance of a transport target in the middle of moving at a predetermined transport speed. In addition, a discrete value of the second counter 82B corresponds to the number of times in which a double feeding detection value Vf obtained in every predetermined sampling cycle belongs to the second determining range R2, that is, a movement distance of a transport target in the middle of moving at a predetermined transport speed.

The discrimination unit 72 assumes that the first detection result is obtained, when a discrete value of the first counter 82A exceeds the first set number of times, and sets a purport that a carrier sheet is being determined. According to the embodiment, a flag which is ON in a predetermined storing region of the storage unit 61 when it is in the middle of determining a carrier sheet is provided. In addition, the discrimination unit 72 sets a purport that a carrier sheet is being determined, by setting the flag to an ON state. The discrimination unit 72 assumes that the second detection result is obtained, when a discrete value of the second counter 82B exceeds the second set number of times. In addition, when the second detection result is obtained in a state in which a flag is ON in the middle of determining a carrier sheet, as a result of obtaining the first detection result, the discrimination unit 72 discriminates a transport target at the time as the carrier sheet CS.

In addition, in a case of discriminating as double feeding of a document D by the discrimination unit 72, the main control unit 70 notifies a user of the purport using lighting or flickering of a notifying unit 27, and by displaying a message on the display unit 102 of the host device 100. A detail of a discriminating method using the discrimination unit 72 will be described later.

A reading control unit 73 controls light emitting of the light source 41, and radiates light to a document D. The reading control unit 73 controls the reading unit 40 in the middle of transporting, and causes the reading unit to read an image of the document D. Specifically, the reading control unit 73 outputs a pulse signal for controlling an operation timing, or the like, in a reading operation of a pixel signal to the image sensor 42 through the TG 64, and controls the reading operation. The analog pixel signal which is input from the image sensor 42 is input to the image processing unit 74 as read data by being converted into a digital pixel signal, through the AFE 65.

The image processing unit 74 performs well-known image correction processing such as a shading correction, a gamma correction, and the like, with respect to the read data which is formed of the digital pixel signal which is input, and generates image data of the document D. At a time of inputting a power supply to the image reading apparatus 11, the color reference plate 43 is read in the reading unit 40, and calibration is performed according to a progress of deterioration which is caused by a temperature dependency or a change with time of characteristics of the light source 41 and the image sensor 42. Specifically, calibration corresponding to a current temperature and a degree of a change with time of the light source 41 and the image sensor 42 is performed, using color data (for example, gray data) which is obtained when the reading unit 40 reads the color reference plate 43 (for example, gray data) at a time of inputting the power supply to the image reading apparatus 11.

In addition, the image processing unit 74 performs different image correction processing in a case in which a transport target is a document D, and a case in which the transport target is the carrier sheet CS which interposes the document D therebetween. Meanwhile, in a case in which the transport target is the carrier sheet CS, image data of the document D is generated, by performing a process of cutting a region of the document D (document region) from the read data, and image correction processing in which an influence of the carrier sheet CS is removed from the data of the document region which is cut. In the image correction processing for the carrier sheet, defect removing processing of making a defect such as a hurt, contamination, or dust inconspicuous, gamma correction processing using a gamma value for the carrier sheet, color correction processing in which an added color caused by discoloration such as yellow tint of the carrier sheet CS is reduced, and the like, are included.

Subsequently, operations of the image reading apparatus 11 will be described.

When causing the image reading apparatus 11 to read a document D, a user sets the document D to the document support 13. In addition, when causing the image reading apparatus to read an image of a document D such as a booklet document, for example, a passport, a bank book, or the like, or a folded document, the document D is set to the document support 13 by interposing the document D between a carrier sheet CS. A user sets reading conditions such as a resolution, a reading color (color/monochrome), and the like, and task conditions including storing conditions such as a storage format, a storage destination, or the like, of read data in the host device 100 using an operation of the input unit 101 of the host device 100. In addition, the user causes the image reading apparatus 11 to start scanning by operating the input unit 101.

Hereinafter, carrier sheet discriminating processing which is executed by a computer will be described, with reference to a flowchart illustrated in FIG. 15. The computer 60 which receives the instruction of starting scanning drives the transport motor 37 at a transport speed corresponding to a designated resolution. When the transport motor 37 is driven, the plurality of pair of rollers 33 to 36 are rotatably driven, and a sheet (transport target) which is set on the document support 13 is fed to the inside of the main body 12 while being separated sheet by sheet using the retard roller of the separating mechanism 38, and the fed sheet is transported along the transport path 32 using the plurality of pair of rollers 33 to 36. A transport position of the sheet is grasped based on a discrete value of a counter which counts the number of pulses of a detection signal (detection pulse signal) of the encoder 44, and when a tip end position of the sheet which is specified from the transport position denoted by the discrete value reaches a double feeding detecting start position which is slightly before the double feeding detecting sensor 46, the carrier sheet discriminating processing based on a detection value Vf of the double feeding detecting sensor 46 is started.

First, in step S11, whether or not a detection value of a double feeding detecting sensor is lower than the second threshold value SH2 (threshold value for determining double feeding) is determined. When the detection value Vf of the double feeding detecting sensor 46 is not lower than the second threshold value SH2, the process proceeds to step S12, and when the detection value Vf is lower than the second threshold value SH2, the process proceeds to step S15. In addition, in a case in which the detection value Vf varies due to flapping, or the like, which occurs before a tip end portion of the transport target is nipped between the pair of transport rollers 35, and it is preferable to count the number of times in which the detection value Vf of the double feeding detecting sensor 46 belongs to the second determining range R2, and determines that the detection value Vf is lower than the second threshold value SH2, when the discrete value exceeds the second set number of times, in step S11.

In step S12, whether or not a detection value of the double feeding detecting sensor is lower than the first threshold value SH1 (threshold value for determining carrier sheet) is determined. When the detection value Vf of the double feeding detecting sensor 46 is lower than the first threshold value SH1, the process proceeds to step S13, and when the detection value Vf is not lower than the first threshold value SH1, the process proceeds to step S14. That is, in steps S11 and S12, whether or not the detection value Vf of the double feeding detecting sensor 46 is in the first determining range R1 which is the second threshold value SH2 or more, and less than the first threshold value SH1 is determined. When the detection value Vf is in the first determining range R1, the process proceeds to step S13, and when the detection value is not in the first determining range R1, the process proceeds to step S14. In addition, in step S12, in a case in which the detection value Vf varies due to flapping, or the like, which occurs before a tip end portion of the transport target is nipped between the pair of transport rollers 35, it is preferable to count the number of times in which the detection value Vf of the double feeding detecting sensor 46 belongs to the first determining range R1, and determines that the detection value Vf is lower than the first threshold value SH1, when the discrete value exceeds the first set number of times.

In step S13, a purport that a carrier sheet is being determined is set. For example, the computer causes a flag denoting that it is in the middle of determining a carrier sheet (hereinafter, also referred to as "flag denoting in the middle of determining", simply) which is prepared in a predetermined storage region in the storage unit 61, and is not illustrated to be ON (for example, "1").

In step S14, whether or not transport of a document is finished is determined. When transporting of the document is not finished, the process returns to step S11, and when transporting of the document is finished, the process proceeds to step S15.

Here, finishing of transporting of the document may mean finishing of transporting until reading of a document D is finished; however, it may denote finishing of transporting of a document up to an ending position of a document transport section in which carrier sheet determining processing is performed. The ending position is set to a position which goes up to a reading start position at which reading of the document D using the reading unit 40 is started, for example. A transport amount from the set position of the document D on the document support 13 is counted in a transport counter 81 which counts the number of pulses of a detection signal of the encoder 44. At this time, a tip end of the document D is detected by the document presence detecting sensor 47, the transport counter 81 is temporarily reset in a point of time in which the document presence detecting sensor 47 is switched from an OFF state to an ON state, and a position of the document D (transport position) in the middle of being transported may be grasped by restarting counting in the transport counter 81 based on the detected tip end position. For example, as illustrated in FIG. 7, when one document D is properly transported, an attenuation degree of an ultrasonic wave of the one document D in the middle of being transported is relatively small. For this reason, as illustrated in FIG. 8, a detection value Vf of the double feeding detecting sensor 46 becomes approximately a constant value which is larger than the first threshold value SH1 while the document D is set to a detecting target. At this time, the discrimination unit 72 discriminates that a transport target is one document D. In addition, the image reading operation of reading an image of the document D is continued.

In step S15, image correction processing for a document is performed with respect to image data of the obtained document D. Image data of the document D is generated by the image correction processing.

In step S16, whether or not it is in the middle of discriminating a carrier sheet is determined. When it is in the middle of discriminating the carrier sheet, the process proceeds to step S17, and when it is not in the middle of discriminating the carrier sheet, the process proceeds step S19. For example, as illustrated in FIG. 12, when a detecting target of the double feeding detecting sensor 46 is the bonding portion 51, it is in the middle of determining a carrier sheet is set, a detecting target of the double feeding detecting sensor 46 is changed to the sheet portion 52 as illustrated in FIG. 13, thereafter, and as illustrated in FIG. 14, it is determined as in the middle of determining a carrier sheet when the double feeding detection value Vf is lower than the second threshold value SH2 (positive determination in step S16).

In step S17, it is discriminated as the carrier sheet, the double feeding detecting sensor 46 is invalidated, and the image reading operation is continued. That is, when the double feeding detection value Vf is lower than the second threshold value SH2, in the middle of determining a carrier sheet which is set when the double feeding detection value Vf is lower than the first threshold value SH1 (threshold value for determining carrier sheet) without being lower than the second threshold value SH2 (threshold value for determining double feeding), the transport target at the time is discriminated as the carrier sheet CS. In addition, the double feeding detecting sensor 46 is invalidated by being set to an OFF state in which detecting is not possible, and the image reading operation of the carrier sheet CS is continued. As a result, the document D is transported, and the reading unit 40 reads an image of the document D at a reading position in the middle of transporting. Image data which is obtained when the image sensors 42A and 42B of the reading unit 40 read the carrier sheet CS is obtained in the image processing unit 74 through the AFE 65.

In step S18, image correction processing for a carrier sheet is performed. The reading unit 40 performs the image correction processing for the carrier sheet with respect to the image data which is obtained when the reading unit 40 reading the carrier sheet. That is, an image from the carrier sheet region is cut with respect to the image data, and an influence of a hurt, or discoloration is reduced using the image correction processing, based on information such as the hurt, or the discoloration of the carrier sheet, which is obtained in advance.

In step S19, double feeding error processing including a stop of the image reading operation is performed by discriminating as double feeding of a document. That is, a transport target is discharged from a discharging port by continuing driving of the transport motor 37, and a reading operation with respect to the transport target using the reading unit 40 is not performed. At this time, the main control unit 70 of the computer 60 notifies a user of a purport of double feeding of a document using the notifying unit 27. For example, a user is notified of a purport of double feeding of a document, when the notifying unit 27 which is adjacent to the operation unit 20 performs lighting or flickering. In addition, image data which is obtained when the image processing unit 74 performs the image correction processing is transmitted to the host device. 100 through the output unit 63 in a designate file format (PDF, JPEG, GIF, or the like). In addition, the host device 100 stores the received image data with the designated storage format stores in a folder in a designated storage destination of the storage unit 104, or performs a mail transfer to a designated mail address.

In this manner, since it is possible to discriminate double feeding of a document D from the carrier sheet CS, an extra operation for invalidating a double feeding inspection is necessary, and it is possible to avoid an erroneous stop of an image reading operation which is caused when a carrier sheet CS is erroneously detected as double feeding of a document D, even when an operation of invalidating the double feeding inspection is forgotten. In addition, according to the embodiment, since it is a configuration in which double feeding of a document D is discriminated from the carrier sheet CS using a detection result of existing sensors 46 and 47 which are provided for another function in the image reading apparatus 11, it is not necessary to provide an exclusive sensor for a carrier sheet (carrier sheet sensor), and it is possible to easily avoid a complicated structure, and a rise in manufacturing cost of the image reading apparatus 11 which are caused by an increase in the number of components.

According to the above described first embodiment, it is possible to obtain the following effects.

(1) An image reading apparatus includes one double feeding detecting sensor 46 as an example of a double feeding detecting unit and a detecting unit which detects double feeding of a document D, and a discrimination unit 72 which discriminates a doubly-fed document D from a carrier sheet CS based on the first detection result which is obtained when the double feeding detecting sensor 46 detects the bonding portion 51 of the carrier sheet CS, and the second detection result which is obtained when the double feeding detecting sensor 46 detects double feeding. Accordingly, it is possible to discriminate the carrier sheet from a doubly-fed document based on the first detection result in which a detection value Vf of the double feeding detecting sensor 46 belongs to the first determining range R1 (SH2≤Vf<SH1), and a second detection result in which the detection value Vf belongs to the second determining range R2 (Vf<SH2). For example, it is possible to discriminate the carrier sheet CS from the doubly-fed document D using the existing sensors 46 and 47, even when an exclusive detecting unit (carrier sheet sensor) which can detect the carrier sheet is not provided.

(2) The discrimination unit 72 discriminates as the carrier sheet CS when the second detection result at a time of detecting double feeding is obtained, after obtaining the first detection result which is obtained when the double feeding detecting sensor 46 detects the bonding portion 51 of the carrier sheet CS. Meanwhile, the discrimination unit 72 discriminates as double feeding of the document D when the second detection result is obtained without obtaining the first detection result. Accordingly, it is possible to discriminate the carrier sheet CS from double feeding of the document D.

(3) The double feeding detecting sensor 46 as an example of the double feeding detecting unit is an ultrasonic wave type. Since an attenuation degree of an ultrasonic wave is smaller than that of the sheet portion at which the document D is interposed, while the double feeding detecting sensor 46 is detecting the bonding portion 51 of the carrier sheet CS, the first detection result in which a detection value Vf exceeds the first threshold value; however, it does not exceed the second threshold value is obtained. Thereafter, when a detecting target of the double feeding detecting sensor 46 is changed from the bonding portion 51 to the sheet portion 52, the second detection result in which a detection value Vf exceeds the second threshold value is obtained, since, in the sheet portion 52, an attenuation degree of an ultrasonic wave is larger than that of the bonding portion 51. When the second detection result is obtained after obtaining the first detection result from the double feeding detecting sensor 46, the discrimination unit 72 discriminates a transport target as the carrier sheet, and discriminates a transport target as double feeding of a document, when obtaining the second detection result without obtaining the first detection result. Accordingly, it is possible to discriminate the carrier sheet from double feeding of a document.

(4) The discrimination unit 72 assumes that the first detection result is obtained when a cumulative number of times in which a detection value Vf of the double feeding detecting sensor 46 exceeds the first threshold value SH1 exceeds the first set number of times. In addition, the discrimination unit assumes that the second detection result is obtained, when a cumulative number of times in which the detection value Vf exceeds the second threshold value SH2 exceeds the second set number of times. Accordingly, for example, even when the detection value Vf of the double feeding detecting sensor 46 varies, and incidentally exceeds the first threshold value or the second threshold value, the value is not set to the first detection result or the second detection result. Accordingly, for example, it is possible to accurately discriminate the carrier sheet CS from double feeding of the document D, relatively, even when the detection value Vf varies due to flapping, or the like, which occurs before a tip end portion of the transport target is nipped between the pair of transport rollers 35.

(5) The discrimination unit 72 continues the image reading operation using the transport unit 31 and the reading unit 40 when discriminating as the carrier sheet CS, and stops the image reading operation using the transport unit 31 and the reading unit 40 when discriminating as double feeding of the document D. For this reason, it is possible to read the document D which is interposed between the carrier sheet CS, and stop the image reading operation considering that there is an error, when it is double feeding of the document D.

(6) The discrimination unit 72 sets the double feeding detecting sensor 46 to an OFF state in which detecting is not possible, when discriminating as the carrier sheet CS. For this reason, it is possible to avoid a situation in which the sheet portion 52 of the carrier sheet CS is erroneously detected as double feeding using the double feeding detecting sensor 46, and an image reading operation is stopped.

Second Embodiment

Subsequently, a second embodiment will be described with reference to FIGS. 16 to 19. The second embodiment is different from the first embodiment in a point in which detection results of two detecting units are used when discriminating the carrier sheet CS, and the discrimination unit 72 discriminates double feeding of a document D from the carrier sheet CS, based on two detection results which are obtained from the two detecting units. A program PR denoted in a flowchart in FIG. 19 is stored in a storage unit 61 in the image reading apparatus 11 according to the embodiment. The discrimination unit 72 according to the embodiment uses the double feeding detecting sensor 46 and the document presence detecting sensor 47 as examples of the two detecting units.

Figure 16:
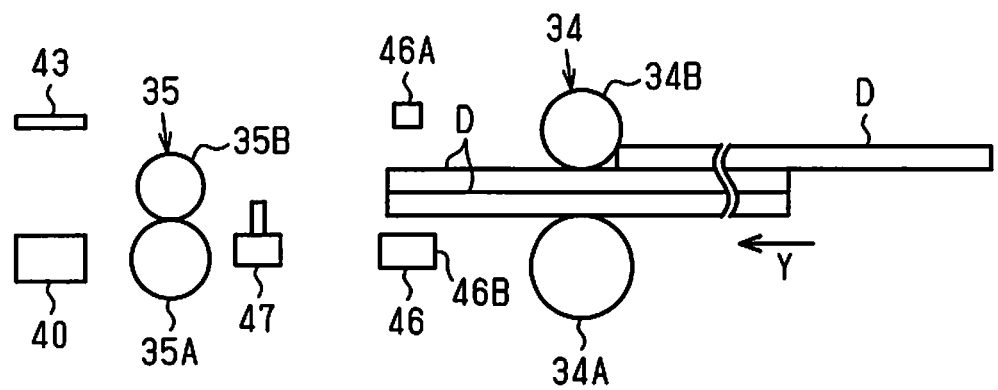
FIG. 16 is a schematic side view which illustrates a state in which a tip end portion of a document which is doubly fed in a second embodiment is detected by the double feeding detecting sensor.

As illustrated in FIG. 16, when the double feeding detecting sensor 46 detects double feeding of a document D, the document presence detecting sensor 47 enters an OFF state without detecting a tip end portion of the document D yet.

Figure 17:
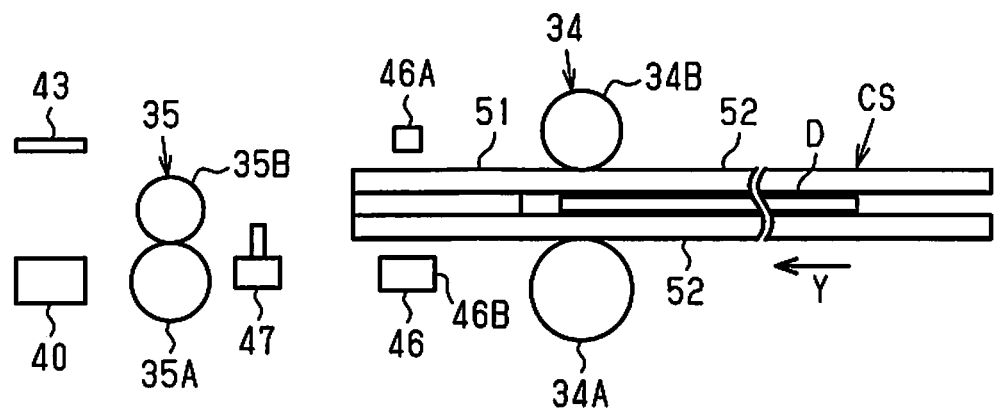
FIG. 17 is a schematic side view which illustrates a state in which the bonding portion of the carrier sheet is detected by the double feeding detecting sensor.

In addition, as illustrated in FIG. 17, in a movement range in which the double feeding detecting sensor 46 is having the bonding portion 51 of the carrier sheet CS as a detecting target, a double feeding detection value Vf is lower than the first threshold value SH1; however, it is the second threshold value SH2 or more. That is, the double feeding detection value Vf belongs to the first determining range R1.

Figure 18:
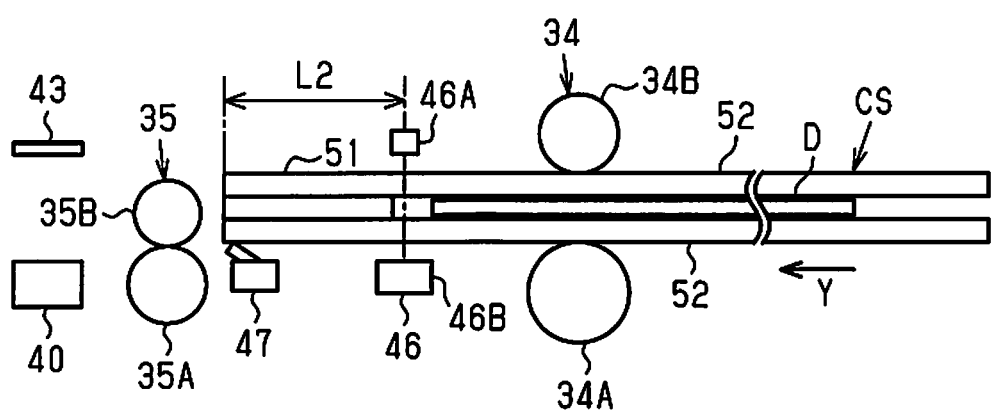
FIG. 18 is a schematic side view which illustrates a state in which the bonding portion of the carrier sheet is detected by a document presence detecting sensor.
Figure 19:
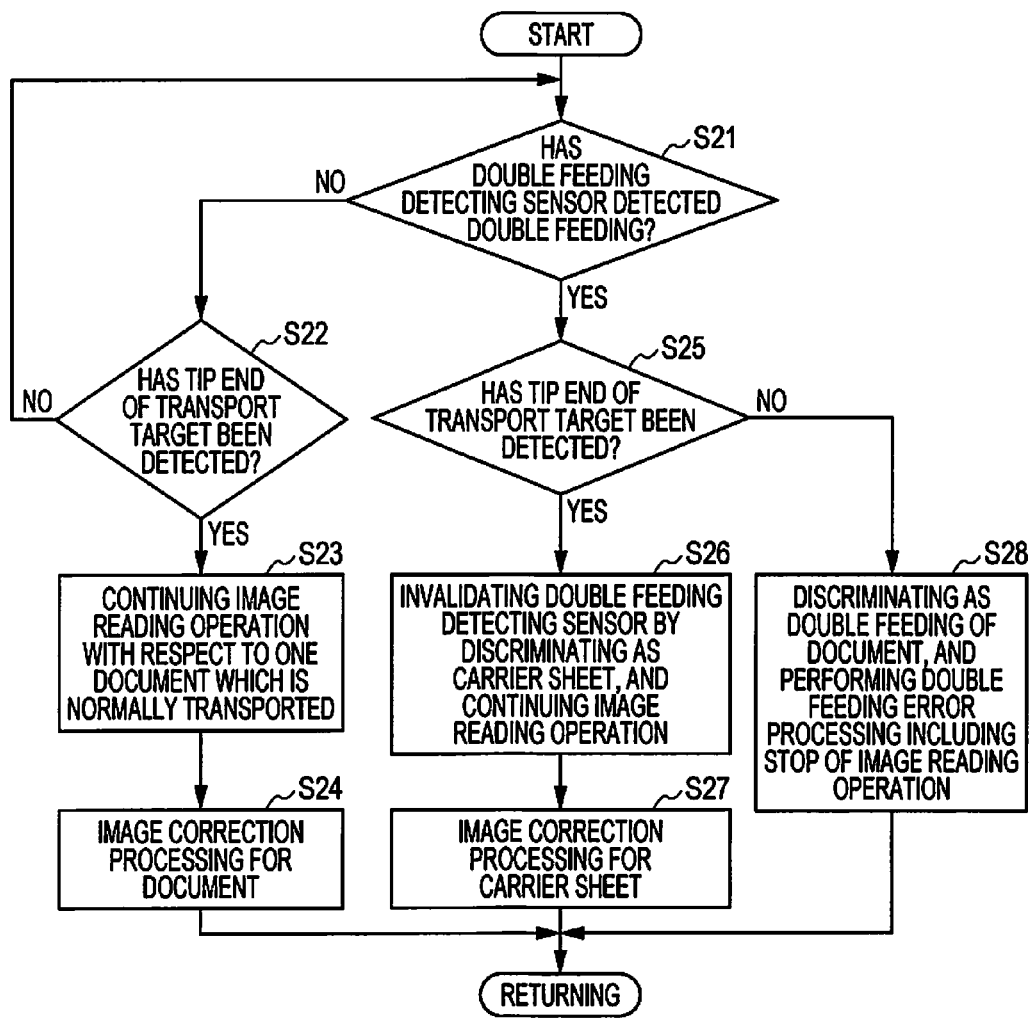
FIG. 19 is a flowchart which describes a carrier sheet discriminating process.

As illustrated in FIG. 18, when a tip end of the carrier sheet CS is detected by the document presence detecting sensor 47, the double feeding detecting sensor 46 is disposed so that a position of a distance L2 from a tip end of the carrier sheet CS to the upstream side in the transport direction Y is set to a detecting target position. When a detecting target of the double feeding detecting sensor 46 is switched from the bonding portion 51 to the sheet portion 52, and a double feeding detection value Vf thereof is lower than the second threshold value SH2, and the double feeding detecting sensor enters a double feeding detecting state, the document presence detecting sensor 47 detects a tip end portion of the carrier sheet CS, and is switched from OFF to ON already. In addition, according to the embodiment, a detection result when the document presence detecting sensor 47 detects a tip end (bonding portion 51) of the carrier sheet CS corresponds to an example of the first detection result. In addition, a detection result when a detecting target of the double feeding detecting sensor 46 is the sheet portion 52 of the carrier sheet CS corresponds to an example of the second detection result.

Hereinafter, carrier sheet discriminating processing according to the second embodiment will be described with reference to a flowchart illustrated in FIG. 19.

In step S21, whether or not the double feeding detecting sensor detected double feeding is determined. When the double feeding detecting sensor 46 does not detect double feeding, the process proceeds to step S22, and when double feeding is detected, the process proceeds to step S25.

In step S22, whether or not a tip end of the transport target is detected is determined. When the tip end of the transport target is not detected, the process returns to step S21, and when the tip end is detected, the process proceeds to step S23. That is, when the transport target is transported to a position at which the tip end is detected by the document presence detecting sensor 47, while double feeding thereof is not detected, it is determined that only one document D is normally transported.

In step S23, an image reading operation with respect to the one document which is normally transported is continued.

Along with transporting of the document, the reading unit 40 reads an image of the document at a reading position in the middle of transporting thereof. A processing unit obtains image data which is obtained when the image sensors 42A and 42B of the reading unit 40 reads the document D, through AFE.

In step S24, image correction processing for a document is performed. An image correction processing unit in the processing unit performs image correction processing for a normal document which is performed with respect to a document which is not interposed between the carrier sheet CS.

In step S25, whether or not a tip end of the transport target (transport sheet) is detected is determined. When the tip end of the transport target is detected, the process proceeds to step S26, and meanwhile, when the tip end is not detected, the process proceeds to step S28.

In step S26, it is discriminated as the carrier sheet, and the image reading operation is continued. That is, if a tip end of the transport target is detected by the document presence detecting sensor 47 when double feeding is firstly detected, the transport target is discriminated as the carrier sheet CS. In addition, the image reading operation of the carrier sheet CS is continued. The reading unit 40 reads an image of the document at a reading position in the middle of transporting thereof, along with transporting of the document D. The image processing unit 74 obtains image data which is obtained when the image sensors 42A and 42B of the reading unit 40 read the carrier sheet CS, through AFE 65.

In step S27, the image correction processing for the carrier sheet is performed. The reading unit 40 performs the image correction processing for the carrier sheet with respect to image data which is obtained when the reading unit 40 reads the carrier sheet CS. That is, an image from a carrier sheet region is cut with respect to the image data, and an influence of a hurt, or discoloration is reduced using the image correction processing, based on information such as the hurt, or the discoloration of the carrier sheet CS, which is obtained in advance.

In step S28, it is discriminated as double feeding of a document, and double feeding error processing which includes a stop of the image reading operation is performed. That is, a transport target is discharged from the discharging port 12B by continuing driving of the transport motor 37, and a reading operation with respect to the transport target using the reading unit 40 is not performed. At this time, the computer 60 notifies a user of a purport of double feeding of a document using the notifying unit 27. For example, the purport of double feeding of a document is notified to the user by lighting an alarm lamp for double feeding in the vicinity of the operation unit 20.

According to the above described second embodiment, it is possible to obtain the same effect as those in (1) to (4) which are described in the first embodiment, similarly, and in addition, it is possible to further obtain the following effects.

(7) As an example of at least one of the detecting units, two of the double feeding detecting sensor 46 and the document presence detecting sensor 47 are provided. There is provided the discrimination unit 72 which discriminates double feeding of a document from a carrier sheet, based on the first detection result which is obtained when the document presence detecting sensor 47 detects the bonding portion 51 of the carrier sheet CS, and the second detection result which is obtained when the double feeding detecting sensor 46 detects double feeding of a document, or the sheet portion 52 which is comparable to double feeding of the document. For example, it is possible to discriminate the carrier sheet CS from double feeding of the document D, even when an exclusive detecting unit which can detect the carrier sheet CS is not provided.

(8) As an example of the plurality of detecting units, the double feeding detecting sensor 46, and the document presence detecting sensor 47 which detects a presence or absence of a document at a position on the downstream side of the double feeding detecting sensor 46 in the transport direction Y of a document are provided. The discrimination unit 72 discriminates as the carrier sheet when the first detection result which is obtained when the document presence detecting sensor 47 detects a document D is obtained, at a time of obtaining the second detection result which is obtained when the double feeding detecting sensor 46 detects double feeding. Meanwhile, the discrimination unit discriminates as double feeding when the first detection result is not obtained, at a time of obtaining the second detection result. Accordingly, it is possible to discriminate the carrier sheet CS from double feeding of the document D, based on the detection result of the double feeding detecting sensor 46, and the detection result of the document presence detecting sensor 47. For example, it is not necessary to provide an exclusive sensor for detecting the carrier sheet CS.

Third Embodiment

Figure 20:
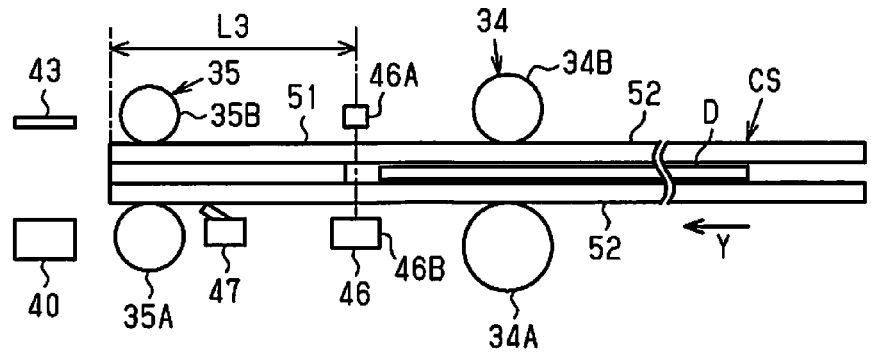
FIG. 20 is a schematic side view which illustrates a state in which a region on the upstream side of the bonding portion of the carrier sheet in a transport direction starts to be detected by the double feeding detecting sensor, in a third embodiment.

Subsequently, carrier sheet discriminating processing according to a third embodiment will be described with reference to FIGS. 20 and 21. In the second embodiment, the length of the bonding portion 51 is set so that a tip end is exactly detected by the document presence detecting sensor 47, when the double feeding detecting sensor 46 starts to detect double feeding in a sheet region on the upstream side of the bonding portion 51 of the carrier sheet CS in the transport direction; however, according to the embodiment, the bonding portion 51 is longer than that. In addition, in the second embodiment, it is discriminated as a carrier sheet, if the document presence detecting sensor 47 has already detected a transport target, when the double feeding detecting sensor 46 detected the transport target. At this time, for example, in a case of a double feeding in which two documents are deviated by a predetermined length in the transport direction, when the document is thick paper, for example, a detection value Vf when the first one document passes through a detecting area of the double feeding detecting sensor 46 is lower than the first threshold value SH1 (threshold value for determining carrier sheet). When a double feeding region of the document passes through the detecting area, after transporting of a predetermined length from that point of time, the detection value Vf of the double feeding detecting sensor 46 is lower than the second threshold value SH2. For this reason, it is discriminated as the carrier sheet. Also in such a case, a distance from a tip end of a transport target to a detection position of the double feeding detecting sensor 46 is counted, by counting the number of pulses of a detection signal of the encoder 44 so that it is possible discriminate as the carrier sheet CS. If a measured distance L3 thereof (refer to FIG. 20) is in an allowable range corresponding to the width L1 of the bonding portion 51, it is discriminated as the carrier sheet CS. As an example of the allowable range, a condition L1≤L3≤L1+α which is the width L1 or more, and a distance L1+α or less, which is obtained by adding a predetermined margin α to the width L1, is set. When the condition is satisfied, it is determined as the carrier sheet CS. Meanwhile, when the measured width L3 of the bonding portion 51 does not satisfy the above described condition, it is discriminated as double feeding of a document D.

Hereinafter, carrier sheet discriminating processing in the third embodiment which is executed by the computer 60 will be described with reference to FIG. 21. According to the embodiment, each process in steps S31 to S34 in FIG. 21, that is, each process when one document is properly transported is the same as that in steps S21 to S24 according to the second embodiment. That is, in a case in which a tip end portion of a transport target is detected by the document presence detecting sensor 47, not detecting of double feeding using the double feeding detecting sensor 46, it is determined that one document D is normally transported, and an image reading operation with respect to the one document D which is normally transported is continued (step S33). In addition, image correction processing for a document applied to a normal document which is not interposed between the carrier sheet is performed with respect to image data which is obtained when the reading unit 40 reads the document D (step S34).

Figure 21:
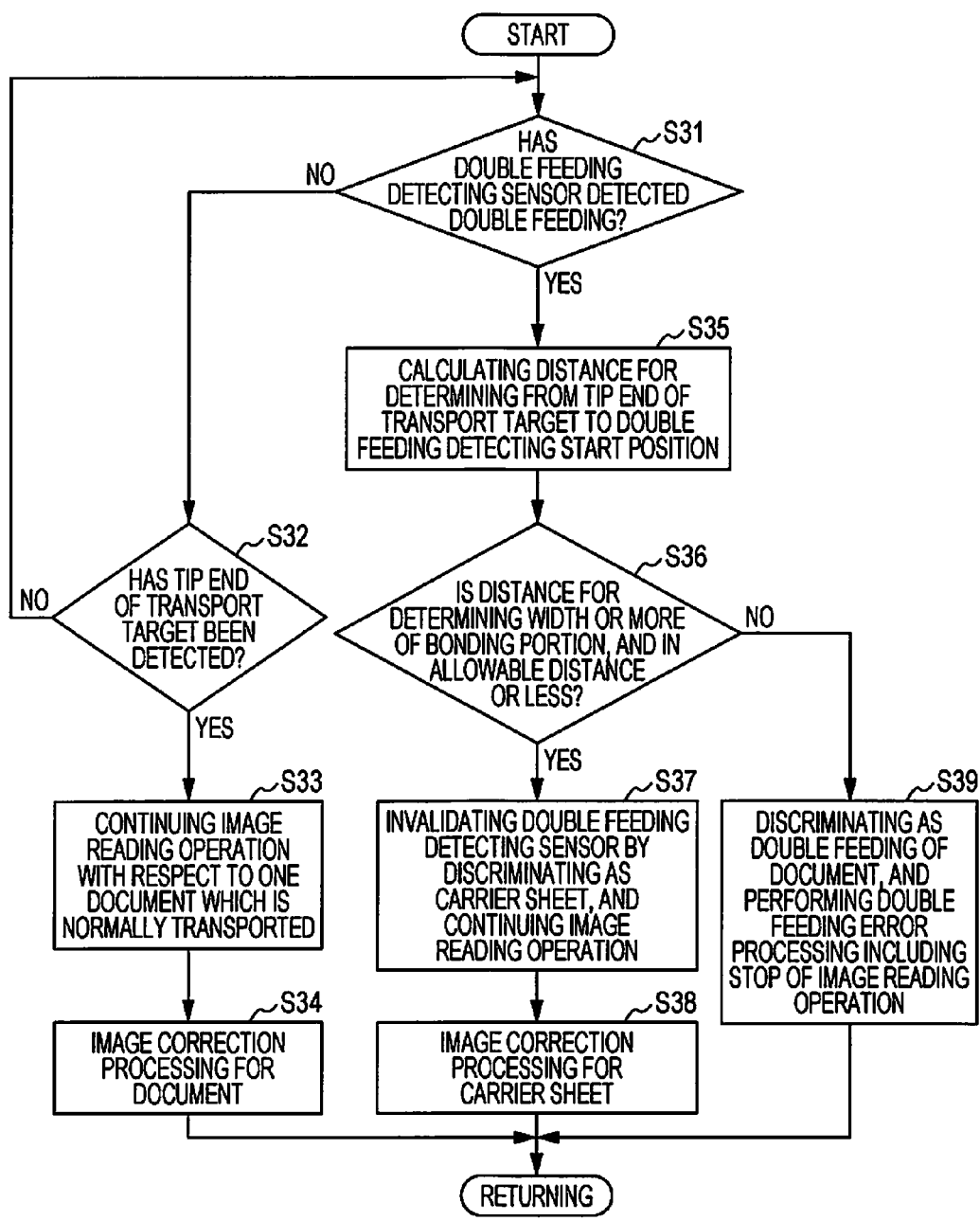
FIG. 21 is a flowchart which describes a carrier sheet discriminating process.

Meanwhile, in a case in which the double feeding detecting sensor 46 detects double feeding in step S31 in FIG. 21, the process moves to step S35. In step S35, the distance L3 for determining (refer to FIG. 20) from a tip end of a transport target to a double feeding detecting start position is calculated. A position of the tip end of the transport target is obtained by counting the number of pluses using the transport counter 81, based on a detection signal of the encoder 44 which includes the number of pulses which is proportional to a driving amount of the transport motor 37 which transports the transport target from a feeding start position. As illustrated in FIG. 20, the distance L3 for determining corresponds to a distance from a tip end position of a transport target based on a discrete value of the transport counter 81 to a detection position of the double feeding detecting sensor 46. The discrimination unit 72 calculates the distance L3 for determining by deducting an equivalent value of a counter of a known detection position of the double feeding detecting sensor 46 from the discrete value of the transport counter 81 which is illustrated in FIG. 20.

In the subsequent step S36, whether or not the distance L3 for determining is the width L1 of the bonding portion 51 or more, and the allowable distance (L1+α) or less is determined. When the condition L1≤L3≤L1+α is satisfied, the process proceeds to step S37, and when the condition is not satisfied, the process proceeds to step S39.

In step S37, double feeding detecting sensor is invalidated by discriminating as the carrier sheet, and the image reading operation is continued. In addition, in the subsequent step S38, the image processing unit 74 executes image correction processing for the carrier sheet with respect to image data which is obtained when the reading unit 40 reads the carrier sheet. That is, a document region is cut from a carrier sheet region with respect to the image data, image correction processing in which a hurt, discoloration, or the like, of a carrier sheet is reduced based on information which is obtained in advance is performed with respect to the image data of the cut document, and image data of the document is obtained.

Meanwhile, in step S39, it is discriminated as double feeding of a document D, and double feeding error processing which includes a stop of the image reading operation is performed. That is, a document D which is doubly fed is discharged by continuing driving of the transport motor 37, and a reading operation using the reading unit 40 is not performed. At this time, the main control unit 70 of the computer 60 notifies a user of a purport of double feeding of a document using the notifying unit 27. For example, when an indicating lamp for notifying double feeding in the notifying unit 27 performs lighting or flickering, a user is notified of the purport of double feeding of a document.

According to the third embodiment, it is possible to obtain the following effects.

(9) When a detection value Vf of the double feeding detecting sensor 46 is switched from a double feeding non-detecting state to a double feeding detecting state, the discrimination unit 72 calculates a distance from a tip end position of a transport target at the time point to a double feeding detecting position (position of double feeding detecting sensor 46) as the distance L3 for determining. The discrimination unit 72 discriminates as the carrier sheet when the distance L3 for determining is in the allowable range (L1≤L3≤L1+α) corresponding to the width L1 of the bonding portion 51. Meanwhile, the discrimination unit 72 discriminates as double feeding of a document D when the distance L3 for determining is not in the allowable range. According to the second embodiment, there is a concern that double feeding, in which two documents D are deviated by a distance longer than the width L1 in the transport direction Y, may be erroneously discriminated as the carrier sheet CS. However, according to the third embodiment, it is discriminated as the carrier sheet CS only when a deviation amount of the document satisfies the condition L1≤L3≤L1+α, and when the condition is not satisfied, it can be discriminated as double feeding of a document D. Accordingly, it is possible to further reliably discriminate double feeding of a document D from the carrier sheet CS.

The above described each embodiment also can be modified as follows.

In the above described second embodiment, an order of checking a detecting state of the plurality of sensors 46 and 47 may be reversed. For example, in a relationship of the distance L1>L2, in a case of a carrier sheet CS in which a detecting target of the double feeding detecting sensor 46 is the bonding portion 51 in a point of time in which a tip end of the carrier sheet CS is detected by the document presence detecting sensor 47, it is possible to apply the following control. That is, when the document presence detecting sensor 47 is switched from a non-detecting state to a detecting state, a detecting target of the double feeding detecting sensor 46 is the bonding portion 51, and a detection value Vf is not lower than the second threshold value SH2 (that is, double feeding non-detecting state). Thereafter, when the detection value Vf is lower than the second threshold value SH2, and it is switched to a double feeding detecting state, it is discriminated as the carrier sheet. That is, if the double feeding detecting sensor 46 is in the double feeding detecting state in a point of time in which the document presence detecting sensor 47 detects the tip end of the transport target, the transport target is discriminated as double feeding of a document, and an image reading operation is stopped at the point of time. Meanwhile, if the double feeding detecting sensor is in the double feeding non-detecting state (that is, in the middle of detecting bonding portion) in a point of time in which the document presence detecting sensor 47 detects the tip end of the transport target, it is discriminated as the carrier sheet, and the image reading operation is continued as is.

In a case of a carrier sheet CS in which a detecting target of the double feeding detecting sensor 46 is the bonding portion 51, in a point of time in which a tip end of the carrier sheet CS is detected by the document presence detecting sensor 47, if the document presence detecting sensor 47 detects the tip end of the transport target, a double feeding inspection based on the double feeding detecting sensor or a detection value Vf thereof may be switched from validity to invalidity. That is, since the double feeding inspection is performed by setting the double feeding detecting sensor to be valid until the document presence detecting sensor detects a transport target, the doubly-fed document D illustrated in FIG. 16 is found using a double feeding inspection, and an image reading operation thereof is stopped. Meanwhile, it may be a configuration in which, when the document presence detecting sensor 47 detects a transport target, the double feeding detecting sensor 46 is switched from validity to invalidity, and a double feeding inspection thereafter is not performed. According to the configuration, it is also possible to cause the image reading operation to be stopped when a transport target is a doubly-fed document D, and causes the image reading operation to be continued when a transport target is the carrier sheet CS.

In the second and third embodiments, an insensible region (insensible zone) in which a double feeding inspection based on a detection value Vf of the double feeding detecting sensor 46 is invalidated may be set between detecting of a tip end of a transport target (downstream end in transport direction) using the document presence detecting sensor 47 and finishing of transporting of a distance corresponding to the width L1 of the bonding portion 51. The insensible region is set in order to prevent an erroneous detecting of double feeding due to flapping of a portion of the document D which is close to the tip end, and is set at a position in which the tip end portion of the document D is nipped by the pair of transport rollers 35, and flapping thereof is suppressed. In this case, when the carrier sheet passes through the insensible region right before the bonding portion thereof passes through a detecting position of the double feeding detecting sensor 46, the double feeding detecting sensor 46 is set to be valid. In addition, after the valid state, when the document presence detecting sensor 47 has already detected a transport target in a point of time in which the detection value Vf of the double feeding detecting sensor 46 is switched from the double feeding non-detecting state to the double feeding detecting state, it is discriminated as the carrier sheet CS. Meanwhile, when the detection value Vf of the double feeding detecting sensor 46 is already in the double feeding detecting state in a point of time in which the double feeding detecting sensor 46 is set to be valid, the transport target is discriminated as a document D which is doubly fed.

According to the second embodiment, in a case in which two documents which are doubly fed are slightly deviated in the transport direction, double feeding is not detected when only one sheet is transported, firstly (head region), and is detected from a time when a start position of overlapping of two sheets reaches a detection position of the double feeding detecting sensor. In this case, when the document presence detecting sensor 47 is in the detecting state when double feeding is detected, there is a concern that it is erroneously detected as the carrier sheet, regardless of the fact that it is double feeding of a document D. However, if a determining method using the first threshold value, and a determining method using the second threshold value in the first embodiment are used together, even when the two documents which are doubly fed are deviated in the transport direction, it is possible to reduce a frequency of generating an erroneous detection in which it is discriminated as the carrier sheet, regardless of the fact that it is double feeding of a document D, since two documents which are doubly fed are detected as double feeding. In addition, also in the third embodiment, a discriminating accuracy in a type and a state of a transport target may be increased by using the discriminating method in the first embodiment together.

In the third embodiment, it is possible to appropriately set an allowable range corresponding to the width L1 of the bonding portion 51. For example, the allowable range may be $L1-\alpha \leq L3 \leq L1+\alpha$, or $L1-\alpha \leq L3 \leq L1+\beta$ (here, $\alpha \neq \beta$).

The image reading apparatus is not limited to a sheet-feeding type, and may be a flatbed-type image reading apparatus which includes a function of automatic document feeding (automatic document feeder) as an example of a transport unit. Also in the configuration, it is possible to obtain the same effect as that in the sheet feeding type, by including the same configuration as that in the above described embodiment, since there is a case in which a method of transporting a carrier sheet CS which interposes a document therebetween, using an automatic document feeder is used. Also in a configuration in which a double feeding detecting sensor is provided in the middle of a transport path of an automatic document feeder, a discrimination unit which can discriminate double feeding of a document from a carrier sheet may be provided so that a carrier sheet is not erroneously detected as double feeding of a document due to the double feeding detecting sensor.

The entire discovery of Japanese Patent Application No.: 2015-203998, filed Oct. 15, 2015 is expressly incorporated by reference herein.

What is claimed is:

1. An image reading apparatus comprising:
   a transport unit which can transport one of a carrier sheet in which two transparent sheets for interposing a document is bonded at a part of a peripheral edge portion, and in a state of interposing a document therebetween, and a document which is set along a transport path;
   a reading unit which reads a document or a document interposed between the carrier sheet at a reading position in the middle of a path on which the document is transported by the transport unit;
   at least one detecting unit which includes a double feeding detecting unit which detects double feeding of a document; and
   a discrimination unit which discriminates double feeding of a document from a carrier sheet based on a first detection result which is obtained when the detecting unit detects a bonding portion of the carrier sheet, and a second detection result which is obtained when the double feeding detecting unit detects double feeding.

2. The image reading apparatus according to claim 1, wherein the discrimination unit discriminates as a carrier sheet when obtaining the second detection result, after obtaining the first detection result which is obtained when the detecting unit detects the bonding portion of the carrier sheet, and discriminates as double feeding of a document, when obtaining the second detection result without obtaining the first detection result.

3. The image reading apparatus according to claim 2, wherein the detecting unit is the double feeding detecting unit of an ultrasonic wave type,
wherein a first threshold value for detecting the bonding portion of the carrier sheet, and a second threshold value for detecting a doubly-fed portion of a document are set as threshold values which are used by the discrimination unit when performing a discrimination based on a detection value of the double feeding detecting unit, and
wherein the discrimination unit discriminates as a carrier sheet when obtaining the second detection result in which a detection value exceeds the second threshold value, after obtaining the first detection result in which the detection value is a value between the first threshold value and the second threshold value, and discriminates as double feeding of a document, when obtaining the second detection result without obtaining the first detection result.

4. The image reading apparatus according to claim 3, wherein the discrimination unit assumes that the first detection result is obtained when a cumulative number of times in which a detection value of the double feeding detecting unit exceeds the first threshold value exceeds a first set number of times, and the second detection result is obtained when a cumulative number of times in which the detection value exceeds the second threshold value exceeds a second set number of times.

5. The image reading apparatus according to claim 1, wherein a plurality of the detecting units which include the double feeding detecting unit, and a document presence detecting unit which detects a presence or absence of a document at a position on a downstream side of the double feeding detecting unit in a transport direction of a document, and
wherein the discrimination unit discriminates as a carrier sheet when the first detection result which is obtained when the document presence detecting unit detects a document is obtained, at a time of obtaining the second detection result which is obtained when the double feeding detecting unit detects the double feeding, and discriminate as double feeding when the first detection result is not obtained, at a time of obtaining the second detection result.

6. The image reading apparatus according to claim 5, wherein the discrimination unit obtains a distance from a tip end of a carrier sheet to a double feeding detecting start position at which double feeding starts to be detected, by the double feeding detecting unit, and discriminates as the carrier sheet when the distance is in an allowable range corresponding to a width of the bonding portion of the carrier sheet in the transport direction.

7. The image reading apparatus according to claim 1, wherein the discrimination unit continues an image reading operation using the transport unit and the reading unit when discriminating as a carrier sheet, and stops the image reading operation using the transport unit and the reading unit when discriminating as double feeding of a document.

8. The image reading apparatus according to claim 7, wherein the discrimination unit sets the double feeding detecting unit to an OFF state in which detecting is not possible, when discriminating as a carrier sheet.

* * * * *